US008650016B2

(12) United States Patent
Lunati et al.

(10) Patent No.: US 8,650,016 B2
(45) Date of Patent: *Feb. 11, 2014

(54) MULTISCALE FINITE VOLUME METHOD FOR RESERVOIR SIMULATION

(75) Inventors: Ivan Fabrizio Lunati, Vaud (CH); Manav Tyagi, Zürich (CH); Seong H. Lee, Berkeley, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,958

(22) Filed: Oct. 27, 2010

(65) Prior Publication Data

US 2011/0098998 A1    Apr. 28, 2011

Related U.S. Application Data

(60) Provisional application No. 61/255,766, filed on Oct. 28, 2009.

(51) Int. Cl.
*G06F 7/60* (2006.01)
*G06F 17/10* (2006.01)
*G06G 7/48* (2006.01)
*G06G 7/50* (2006.01)

(52) U.S. Cl.
USPC ................... 703/10; 703/2; 703/6; 703/9

(58) Field of Classification Search
USPC ............................. 703/10, 6, 2, 9
See application file for complete search history.

(56) References Cited

U.S. PATENT DOCUMENTS

| 4,821,164 A | 4/1989 | Swanson |
| 5,321,612 A | 6/1994 | Stewart |

(Continued)

FOREIGN PATENT DOCUMENTS

| WO | WO99/52048 | 10/1999 |
| WO | WO99/57418 | 11/1999 |

(Continued)

OTHER PUBLICATIONS

Hajibeygi, Hadi et al., "Iterative Multiscale Finite-Volume Method", Jun. 26, 2008, Journal of Computational Physics 227, Elsevier Inc.*

(Continued)

*Primary Examiner* — David Silver
*Assistant Examiner* — Cedric D Johnson
(74) *Attorney, Agent, or Firm* — Carlos Hanze; Tiffany E. Weksberg

(57) ABSTRACT

A Multiscale Finite Volume (MSFV) method is provided to efficiently solve large heterogeneous problems; it is usually employed for pressure equations and delivers conservative flux fields to be used in transport problems. It relies on the hypothesis that the fine-scale problem can be described by a set of local solutions coupled by a conservative coarse-scale problem. In numerically challenging cases, a more accurate localization approximation is used to obtain a good approximation of the fine-scale solution. According to an embodiment, a method is provided to iteratively improve the boundary conditions of the local problems, and is responsive to the data structure of the underlying MSFV method and employs a Krylov-subspace projection method to obtain an unconditionally stable scheme and accelerate convergence. In one embodiment the MSFV operator is used. Alternately, the MSFV operator is combined with an operator derived from the problem solved to construct the conservative flux field.

21 Claims, 20 Drawing Sheets

(56) References Cited

U.S. PATENT DOCUMENTS

| | | | |
|---|---|---|---|
| 5,663,928 | A | 9/1997 | De Bazelaire et al. |
| 5,729,451 | A | 3/1998 | Gibbs et al. |
| 5,923,329 | A | 7/1999 | Beale |
| 6,018,497 | A | 1/2000 | Gunasekera |
| 6,078,869 | A | 6/2000 | Gunasekera |
| 6,106,561 | A | 8/2000 | Farmer |
| 6,185,512 | B1 | 2/2001 | Lambrecht |
| 6,266,619 | B1 | 7/2001 | Thomas et al. |
| 6,631,202 | B2 | 10/2003 | Hale |
| 6,662,109 | B2 | 12/2003 | Roggero et al. |
| 6,721,694 | B1 | 4/2004 | Lambrecht et al. |
| 6,766,255 | B2 | 7/2004 | Stone |
| 6,823,297 | B2 | 11/2004 | Jenny et al. |
| 6,826,520 | B1 | 11/2004 | Khan et al. |
| 7,480,206 | B2 | 1/2009 | Hill |
| 7,496,488 | B2 | 2/2009 | Jenny et al. |
| 7,546,229 | B2 | 6/2009 | Jenny et al. |
| 7,634,395 | B2 | 12/2009 | Flandrin et al. |
| 7,720,658 | B2 | 5/2010 | Ricard et al. |
| 7,765,091 | B2 | 7/2010 | Lee et al. |
| 2002/0013687 | A1 | 1/2002 | Ortoleva |
| 2005/0177354 | A1* | 8/2005 | Jenny et al. ............... 703/10 |
| 2006/0235667 | A1* | 10/2006 | Fung et al. ............... 703/10 |
| 2007/0010979 | A1* | 1/2007 | Wallis et al. ............. 703/10 |
| 2008/0208539 | A1* | 8/2008 | Lee et al. ................. 703/1 |
| 2010/0004908 | A1 | 1/2010 | Lunati et al. |

FOREIGN PATENT DOCUMENTS

| | | |
|---|---|---|
| WO | WO00/79423 | 12/2000 |
| WO | WO01/06091 | 1/2001 |
| WO | WO01/27755 | 4/2001 |
| WO | WO01/27858 | 4/2001 |
| WO | WO02/06857 | 1/2002 |

OTHER PUBLICATIONS

Lunati, Ivan et al., The Multiscale Finite Volume Method: A Flexible Tool to Model Physically Complex Flow in Porous Media, Sep. 4-7, 2006, 10th European Conference on the Mathematics of Oil Recovery.*

He, C. et al., "Structured Flow-Based Gridding and Upscaling for Modeling Subsurface Flow", Feb. 28, 2006, Advances in Water Resources 29, Elsevier Ltd.*

Chen, Yuguang et al., "Nonlinear Two-Point Flux Approximation for Modeling Full-Tensor Effects in Subsurface Flow Simulations", Jan. 23, 2008, Springer Science and Business Media B.V.*

MacLachlan, Scott Patrick, "IMproving Robustness in Multiscale Methods", 2004, Department of Applied Mathematics, Graduate School of the University of Colorado.*

Lipnikov, K. et al., "A Multilevel Multiscale Mimetic (M3) Method for Two-Phase Flows in Porous Media", Apr. 17, 2008, Los Alamos National Laboratory, Theoretical Division.*

Saad, Youcef et al., "GMRES: A Generalized Minimal Residual Algorithm for Solving Nonsymmetric Linear Systems", Jul. 1986, Siam J. Sci. Stat. Comput., vol. 7, No. 3, Society for Industrial and Applied Mathematics.*

Zhou, H et al., "Operator-Based Multiscale Method for Compressible Flow", Feb. 26-28, 2007, Society of Petroleum Engineers.*

Lunati, Ivan et al., "Multiscale Finite-Volume Method for Compressible Multiphase Flow in Porous Media", Feb. 10, 2006, Journal of Computational Physics 216, Elsevier, Inc.*

Hajibeygi, Hadi et al., Iterative Multiscale Finite-volume Method, Journal of Computational Physics, Oct. 2008, vol. 227, Issue 19, pp. 8604-8621.

Techelepi, Hamdi A. et al., An Adaptive Multiphase Multiscale Finite Volume Simulator for Heterogeneous Reservoirs, In: SPE Reservoir Simulation Symposium, Jan. 31-Feb. 2, 2005, pp. 1-10.

PCT Search Report, PCT/US2010/054320, Jul. 28, 2011.

Aarnes, J. E., Kippe, V., and Lie, K.A., Mixed Multiscale Finite Elements and Streamline Methods for Reservoir Simulation of Large Geomodels, Advances in Water Resources, vol. 28, pp. 257-271, 2005, Elsevier Ltd.

Arbogast, T., Numerical Subgrid Upscaling of Two-Phase Flow in Porous Media, Numerical Treatment of Multiphase Flows in Porous Media, Lecture Notes in Physics, vol. 552, pp. 35-49, 2000, Springer-Verlag Berlin Heidelberg.

Arbogast, T. and Bryant, S.L., Numerical Subgrid Upscaling for Waterflood Simulations, SPE Reservoir Simulation Symposium, Feb. 11-14, 2001, pp. 1-14, Paper No. 66375-MS, Society of Petroleum Engineers Inc., Houston, Texas.

Bratvedt, F., Gimse, T., and Tegnander, C., Streamline Computations For Porous Media Flow Including Gravity, Transport in Porous Media, vol. 25, pp. 63-78, 1996, Kluwer Academic Publishers.

Busigin, A. and Phillip, C.R., Efficient Newton-Raphson and Implicit Euler Methods For Solving the HNC Equation, Molecular Physics, vol. 76, Issue 1, pp. 89-101, 1992, Taylor & Francis Ltd.

Chen, Z. and Hou, T.Y., A Mixed Multiscale Finite Element Method For Elliptic Problems With Oscillating Coefficients, Mathematics of Computation, vol. 72, No. 242, pp. 541-576, 2002, American Mathematical Society.

Chien, M.C.H., Wasserman, M.L., Yardumian, H.E., Chung, E.Y., Nguyen, T., and Larson, J., The Use of Vectorization and Parallel Processing for Reservoir Simulation, SPE Reservoir Simulation Symposium, Feb. 1-4, 1987, pp. 329-341, Paper No. 16025-MS, Society of Petroleum Engineers Inc., San Antonio, Texas.

Christie, M.A. and Blunt, M.J., Tenth SPE Comparative Solution Project: A Comparison of Upscaling Techniques, SPE Reservoir Simulation Symposium, Feb. 11-14, 2001, pp. 1-13, Paper No. 66599, Society of Petroleum Engineers Inc., Houston, Texas.

Durlofsky, L.J., Numerical Calculation of Equivalent Grid Block Permeability Tensors for Heterogeneous Porous Media, Water Resources Research, vol. 27, No. 5, pp. 699-708, May 1991, American Geophysical Union.

Durlofsky, L.J., A Triangle Based Mixed Finite Element-Finite Volume Technique for Modeling Two Phase Flow Through Porous Media, Journal of Computational Physics, vol. 105, pp. 252-266, 1993, Academic Press, Inc.

Durlofsky, L.J., Jones, R.C., and Milliken, W.J., A Nonuniform Coarsening Approach for the Scale-Up of Displacement Processes in Heterogeneous Porous Media, Advances in Water Resources, vol. 20, pp. 335-347, 1997, Elsevier Science Ltd.

Efendiev, Y.R.; Hou, T.Y., and Wu, X.H., Convergence of a Nonconforming Multiscale Finite Element Method, SIAM Journal of Numerical Analysis, vol. 37, No. 3, pp. 888-910, 2000, Society for Industrial and Applied Mathematics.

Efendiev, Y.R. and Wu, X.H., Multiscale Finite Element For Problems With Highly Oscillatory Coefficients, Numerische Mathematik, vol. 90, pp. 459-486, 2002, Springer-Verlag.

Fujiwara, K., Okamoto, Y., Kameari, A., Ahagon, A., The Newton-Raphson Method Accelerated By Using a Line Search—Comparison Between Energy Functional and Residual Minimization, IEEE Transactions on Magnetics, vol. 41, No. 5, pp. 1723-1727, 2005, Institute of Electrical and Electronics Engineers, Inc.

Hajibeyge, H., Bonfigli, G., Hesse, M.A., and Jenny, P., Iterative Multiscale Finite-Volume Method, Journal of Computational Physics, vol. 227, Issue 19, pp. 8604-8621, 2008, Elsevier Inc.

Hou, T.Y. and Wu, X.H., A Multiscale Finite Element Method for Elliptic Problems in Composite Materials and Porous Media, Journal of Computational Physics, vol. 134, pp. 169-189, 1997, Academic Press.

Jenny, P., Lee, S. H., Tchelepi, H. A., Adaptive Multiscale Finite-Volume Method for Multiphase Flow and Transport in Porous Media, Multiscale Modeling and Simulation, vol. 3, No. 1, pp. 50-64, 2004, Society for Industrial and Applied Mathematics.

Jenny, P., Lee, S.H., Tchelepi, H.A., Adaptive Fully Implicit Multi-Scale Finite-Volume Method for Multi-Phase Flow and Transport in Heterogeneous Porous Media, Journal of Computational Physics, vol. 217, pp. 627-641, 2006, Elsevier Inc.

Jenny, P., Wolfsteiner, C., Lee, S.H., and Durlofsky, L.J., Modeling Flow in Geometrically Complex Reservoirs Using Hexahedral Multi-Block Grids, SPE Reservoir Simulation Symposium, Feb. 11-14, 2001, pp. 1-10, Paper No. 66357, Society of Petroleum Engineers Inc., Houston, Texas.

(56) References Cited

OTHER PUBLICATIONS

Kippe, V., Aarnes, J.E., Lie, K.A., A Comparison of Multiscale Methods for Elliptic Problems in Porous Media Flow, Computational Geosciences, vol. 12, No. 3, pp. 377-398, 2008, Springer Science & Business Media B.V.

Lee, S.H., Durlofsky, L.J., Lough, M.F., and Chen, W.H., Finite Difference Simulation of Geologically Complex Reservoirs With Tensor Permeabilities, SPE Reservoir Evaluation & Engineering, pp. 567-574, Dec. 1998, Society of Petroleum Engineers Inc.

Lee, S.H., Tchelepi, H., and Dechant, L.F., Implementation of a Flux-Continuous Finite Difference Method for Stratigraphic, Hexahedron Grids, SPE Reservoir Simulation Symposium, Feb. 14-17, 1999, pp. 1-11, Paper No. 51901, Society of Petroleum Engineers, Inc., Houston, Texas.

Lunati, I. and Jenny P., The Multiscale Finite Volume Method: A Flexible Tool to Model Physically Complex Flow in Porous Media, 10$^{th}$ European Conference on the Mathematics of Oil Recovery, Sep. 4-7, 2006, Amsterdam, The Netherlands.

Lunati, I. and Jenny P., Multiscale Finite-Volume Method for Compressible Multiphase Flow in Porous Media, Journal of Computational Physics, vol. 216, pp. 616-636, 2006, Elsevier Inc.

Oak, M.J., Baker, L.E., and Thomas, D.C., Three-Phase Relative Permeability of Berea Sandstone, Journal of Petroleum Technology, vol. 42, No. 8, pp. 1054-1061, Aug. 1990, Society of Petroleum Engineers.

Salibian-Barrera, M., Fast and Stable Bootstrap Methods for Robust Estimates, Interface Foundation Annual Meeting, pp. 1-14, 2002, Montreal, QC.

Shi, G. and Liu, X., Multi-Parameter Accelerated Modified Newton-Raphson Methods for Rigid-Plastic FE Analysis, Acta Mechanica Solida Sinica, vol. 15, No. 4, pp. 323-331, Dec. 2002, The Chinese Society of Theoretical and Applied Mechanics, Beijing, China.

Tesch, J., The Newton-Raphson Method and its Application to Fixed Points, Nov. 21, 2005, Center for Hybrid and Embedded Software Systems at the University of California, Berkeley, Berkeley, Californina.

Wallstrom, T.C., Hou, S., Christie, M.A., Durlofsky, L.J. and Sharp, D.H., Application of a New Two-Phase Upscaling Technique to Realistic Reservoir Cross Sections, SPE Reservoir Simulation Symposium, Feb. 14-17, 1999, pp. 451-462, Paper No. 51939, Society of Petroleum Engineers Inc., Houston, Texas.

\* cited by examiner

MULTISCALE FINITE VOLUME METHOD FOR RESERVOIR SIMULATION

CROSS-REFERENCE TO RELATED APPLICATION

The present application for patent claims the benefit of U.S. Provisional Application for Patent bearing Ser. No. 61/255,766, filed on Oct. 28, 2009, the entirety of the application is incorporated herein by reference.

TECHNICAL FIELD

The present invention generally relates to simulators for characterizing subsurface reservoirs, and more particularly, to simulators that use multiscale methods to simulate fluid flow within subsurface reservoirs.

BACKGROUND

Natural porous media, such as subsurface reservoirs containing hydrocarbons, are typically highly heterogeneous and complex geological formations. High-resolution geological models, which often are composed of millions of grid cells, are generated to capture the detail of these reservoirs. Current reservoir simulators are encumbered by the level of detail available in the fine-scale models and direct numerical simulation of subsurface fluid flow on the fine-scale is usually not practical. Various multiscale methods, which account for the full resolution of the fine-scale geological models, have therefore been developed to allow for efficient fluid flow simulation.

Multiscale methods include multiscale finite element (MSFE) methods, mixed multiscale finite element (MMSFE) methods, and multiscale finite volume (MSFV) methods. All of these multiscale methods can be applied to compute approximate solutions at reduced computational cost. While each of these methods reduce the complexity of a reservoir model by incorporating the fine-scale variation of coefficients into a coarse-scale operator, each take a fundamentally different approach to constructing the coarse-scale operator.

The multiscale finite volume (MSFV) method is based on a finite volume methodology in which the reservoir domain is partitioned into discrete sub-volumes or cells and the fluxes over the boundaries or surfaces of each cell are computed. Since the fluxes leaving a particular cell are equivalent to the fluxes entering an adjacent cell, finite volume methods are considered to be conservative. Thus, the accumulations of mass in a cell are balanced by the differences of mass influx and outflux. Accordingly, mass conservation is strictly honored by multiscale finite volume (MSFV) methods, which can be very important in some reservoir simulation applications such as when a mass conservative fine-scale velocity field is needed for multiphase flow and transport simulations.

The multiscale finite element (MSFE) and mixed multiscale finite element (MMSFE) methods are based on a finite element scheme, which breaks the reservoir domain into a set of mathematical spaces commonly referred to as elements. Physical phenomenon within the domain is then represented by local functions defined over each element. These methods are not mass conservative in a strict sense due to their underlying formulation, however, some finite element methods have been able to account for this shortcoming by coupling the pressure and velocity basis functions, such as in mixed multiscale finite element (MMSFE) methods. However, such methods are computationally expensive and typically are not practical for use in commercial reservoir simulators.

SUMMARY

According to an aspect of the present invention, a multiscale method is disclosed for use in simulating a fine-scale geological model of a subsurface reservoir. The method includes providing a fine-scale geological model of a subsurface reservoir associated with a fine-scale grid having a plurality of fine-scale cells. The method includes defining a primary coarse-scale grid having a plurality of primary coarse-scale cells and a dual coarse-scale grid having a plurality of dual coarse-scale cells. The dual coarse-scale grid defines a portion of the fine-scale cells as internal, edge, and node cells. A coarse-scale operator is constructed based on the internal, edge, and node cells and pressure in the dual coarse-scale cells is computed using the coarse-scale operator. A conservative flux field is computed using the pressure in the dual coarse-scale cells while accounting for transverse fluxes between the dual coarse-scale cells such as between edge cells. A display is produced based on the conservative flux field. For example, the display can include a representation of pressure distributions, velocity fields, and fluid flow within the subsurface reservoir.

The edge cells can be fine-scale cells having an interface, which is a transition between adjacent dual coarse-scale cells, traversing therethrough. The node cells can be fine-scale cells having portions of at least two interfaces traversing therethrough. The internal cells can be fine-scale cells free of an interface between adjacent dual coarse-scale cells.

In one or more embodiments, the conservative flux field is computed using iteratively solved local boundary conditions.

In one or more embodiments, the transverse fluxes are computed based on a previous pressure solution in the dual coarse-scale cells.

In one or more embodiments, the transverse fluxes are computed from local solutions on the primary coarse-scale grid.

In one or more embodiments, the transverse fluxes are computed using a relaxation parameter. For example, the relaxation parameter can be computed based on residual histories. In another example, the relaxation parameter is optimized based on sets of successive residuals.

In one or more embodiments, the coarse-scale operator is stabilized using a Krylov-subspace accelerator.

In one or more embodiments, the coarse-scale operator is stabilized using a smoothing operator.

Another aspect of the present invention includes a multiscale method for use in simulating a fine-scale geological model of a subsurface reservoir. The method includes providing a fine-scale geological model of a subsurface reservoir associated with a fine-scale grid having a plurality of fine-scale cells. The method includes defining a primary coarse-scale grid having a plurality of primary coarse-scale cells. The method includes defining a dual coarse-scale grid having a plurality of dual coarse-scale cells such that adjacent dual coarse-scale cells form an interface that traverses some of the fine-scale cells. The fine-scale cells that are traversed by a single interface are defined as edge cells. The fine-scale cells that are traversed by portions of at least two interfaces are defined as node cells. The fine-scale cells that are free of an interface are defined as internal cells. Pressure is computed in the dual coarse-scale cells. A conservative flux field is computed using the pressure in the dual coarse-scale cells while accounting for transverse fluxes between the dual coarse-scale cells such as between edge cells. A display is produced based on the conservative flux field. For example, the display can include a representation of pressure distributions, velocity fields, and fluid flow within the subsurface reservoir.

In one or more embodiments, the conservative flux field is computed using iteratively solved local boundary conditions.

In one or more embodiments, the transverse fluxes are computed based on a previous pressure solution in the dual coarse-scale cells.

In one or more embodiments, the transverse fluxes are computed from local solutions on the primary coarse-scale grid.

In one or more embodiments, the transverse fluxes are computed using a relaxation parameter. For example, the relaxation parameter can be computed based on residual histories. In another example, the relaxation parameter is optimized based on sets of successive residuals.

In one or more embodiments, the coarse-scale operator is stabilized using a Krylov-subspace accelerator.

In one or more embodiments, the coarse-scale operator is stabilized using a smoothing operator.

Another aspect of the present invention includes a system for use in simulating a fine-scale geological model of a subsurface reservoir. The system includes a database, computer processor, a software program, and a visual display. The database is configured to store data such as fine-scale geological models, fine-scale grids, primary coarse-scale grids, dual coarse-scale grids, and coarse-scale operators. The computer processor is configured to receive data from the database and execute the software program. The software program includes a coarse-scale operator module and a computation module. The coarse-scale operator module constructs coarse-scale operators. The computation module computes pressure in the dual coarse-scale cells using the coarse-scale operators. The computation module also computes conservative flux fields using the pressure in the dual coarse-scale cells while accounting for transverse fluxes between the dual coarse-scale cells such as between edge cells. The visual display can display system outputs such as pressure distributions, velocity fields, and simulated fluid flow within the subsurface reservoir.

Another aspect of the present invention includes software stored on a processor readable medium for use in simulating a fine-scale geological model of a subsurface reservoir. The software includes a coarse-scale operator module and a computation module. The coarse-scale operator module constructs coarse-scale operators based on internal cells, edge cells, and node cells defined on a fine-scale grid by a dual coarse-scale grid having a plurality of dual coarse-scale cells. The computation module computes pressure in the dual coarse-scale cells using the coarse-scale operator. The computation module also computes a conservative flux field using the pressure in the dual coarse-scale cells while accounting for transverse fluxes between the dual coarse-scale cells such as between edge cells.

DETAILED DESCRIPTION

Figure 1:
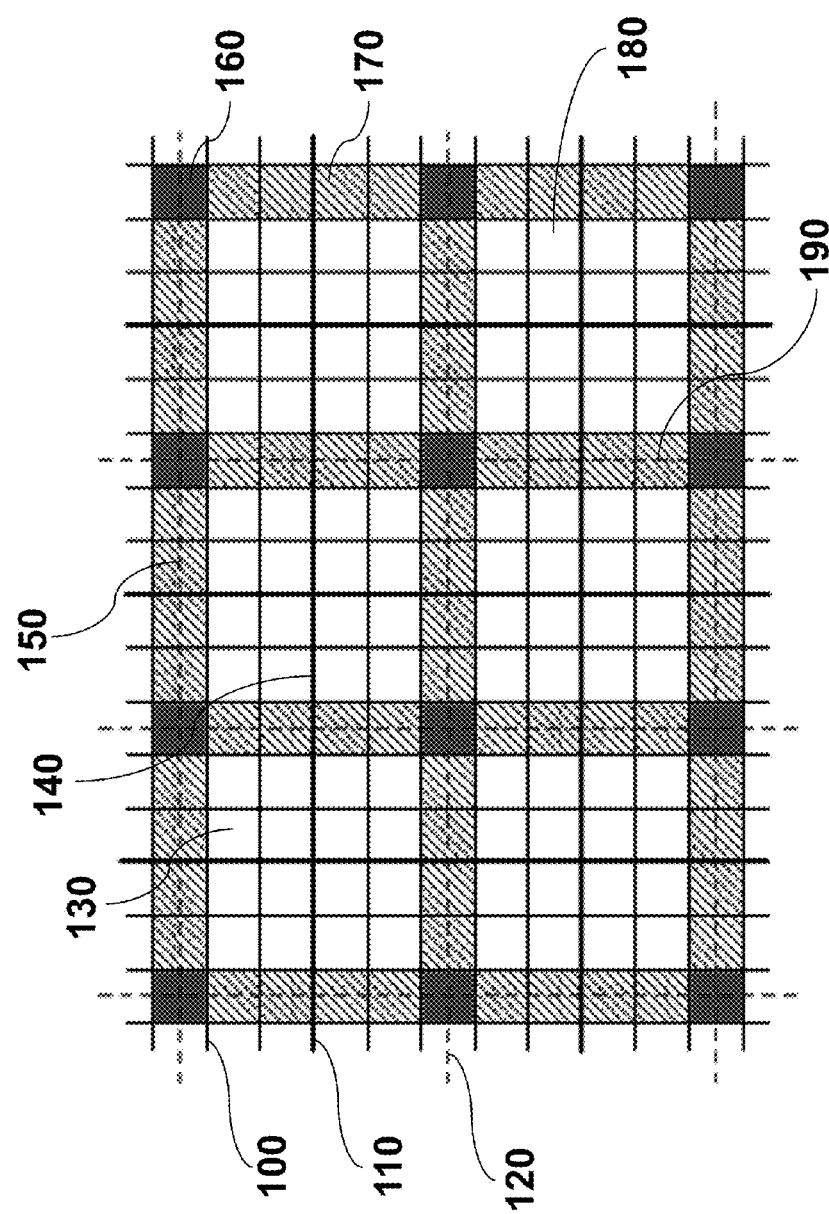
FIG. 1 is a schematic view of a two-dimensional fine-scale grid domain partitioned into internal, edge, and node point cells, in accordance with an aspect of the present invention.

Embodiments of the present invention describe methods that utilize multiscale physics and are applied to simulation of fluid flow within a subterranean reservoir. Modeling flow and transport in geological porous media is important in many energy-related and environmental problems, including reservoir simulation, CO2 sequestration, and management of water resources. Since the flow field, which is necessary to solve the transport equation, is dictated by permeability—a highly heterogeneous medium property, applications typically require solving problems with many degrees of freedom and highly heterogeneous coefficients.

A Multiscale Finite Volume (MSFV) method has been developed to efficiently solve large heterogeneous problems (elliptic or parabolic); it is usually employed for pressure equations and delivers conservative flux fields to be used in transport problems. The method essentially relies on the hypothesis that the fine-scale problem can be reasonably described by a set of local solutions coupled by a conservative global (coarse-scale) problem. In most cases, the boundary conditions assigned for the local problems are satisfactory and the approximate conservative fluxes provided by the method are accurate without iterative improvements.

In numerically challenging cases, however, a more accurate localization approximation is used to obtain a good approximation of the fine-scale solution. According to an embodiment of the invention, a procedure or method is provided to iteratively improve the boundary conditions of the local problems. The method is responsive to the data structure of the underlying MSFV method and employs a Krylov-subspace projection method to obtain an unconditionally stable scheme and accelerate convergence.

In one embodiment the MSFV operator is used. In another embodiment, the MSFV operator is combined in a two step method with an operator derived from the problem solved to construct the conservative flux field. The resulting iterative MSFV algorithms or methods allow arbitrary reduction of the solution error without compromising the construction of a conservative flux field, which is guaranteed at any iteration. Since it converges to the exact solution, the method can be regarded as a linear solver. In this context, the embodiments can advantageously be viewed as preconditioned versions of the Generalized Minimal Residual method (GMRES), with a very peculiar beneficial characteristic that the residual on the coarse grid is zero at any iteration—thus conservative fluxes can be obtained.

Previous Multiscale Finite-Volume (MSFV) methods have been developed to offer a computationally efficient alternative to the direct solution of such large (fine-scale) problems. The MSFV method has been extended to solve physically complex flow, which includes compressibility effects, gravity and capillarity, complex wells, and interphase mass exchange. The main idea, shared with other related multiscale methods, is to compute an approximate solution that models the system behavior with reasonable accuracy. This is achieved by solving a set of localized fine-scale problems, which are coupled by a global coarse-scale problem.

In the previous MSFV methods, approximations are introduced only by the localization assumption: on the boundaries between adjacent sub-domains, problems of reduced dimensionality are solved to assign Dirichlet boundary conditions for the localized problems. This implies that fluxes transverse to the boundary are neglected, or, more precisely, that the flux derivative perpendicular to the boundary is zero. In many numerical test cases considered in the literature, this localization has proven accurate.

However, numerically challenging cases such as flow in channelized formations, in media with impermeable barriers, or in highly anisotropic formations entail a more accurate localization assumption to obtain a good approximation of the fine-scale solution.

This is accomplished by estimating the neglected transverse fluxes at the subdomain boundaries: errors in the localization approximation have to be quantified and a technique has to be established that systematically reduces numerical errors of MSFV to an acceptable tolerance. Previously, an iterative algorithm has been introduced in which the solution is smoothed by applying line relaxation in all spatial directions. However, as the MSFV solution is allowed to be iterated, this method has a strong resemblance to domain decomposition techniques and theory and practice of iterative linear solver can be adopted.

According to an embodiment, a natural and elegant approach is employed to iteratively improve the quality of the localization assumption: construct an iterative method based on the MSFV operator only, which can be stabilized by use of a Krylov-space accelerator.

A two-dimensional discrete boundary value problem of the form $$Au=r \qquad \text{Equation (1)}$$

in the unknown $u=[u_1 \, u_2 \ldots u_j \ldots U_{N_f}]^T$, where $u_j=u(x_j)$ is defined at a discrete set of points $I_f=\{x_j\}_{j\in[1,N_f]}$, can be written in compact notation $u=[u(x_j\epsilon I_f)]^T$; and with the source term $r=[r(x_j\epsilon I_f)]^T=[r_1 \, r_2 \ldots r_j \ldots r_{N_f}]^T$. The matrix $A=[a_{jk}]$ is symmetric and positive definite. Typically, Eq. (1) represents an elliptic or parabolic problem satisfied by a scalar field (hereafter "pressure") that determines a flux field (proportional to the pressure gradient) to be employed in a transport equation. In the following herein, the assumption is made that the points $x_j\epsilon I_f$ are defined as the cell centers of a Cartesian grid and that a 5-point stencil is used, such that the coefficient matrix A has pentadiagonal structure.

FIG. 1 depicts the architecture of the multiscale finite volume method with a fine-scale grid 100, a conforming primal coarse-scale grid 110 shown in bolded solid line, and a conforming dual coarse-scale grid 120 shown in dashed line. The fine-scale grid 100 includes of a plurality of fine-scale cells 130. The primal coarse-scale grid 110 has primal coarse-scale cells 140 and is constructed on the fine-scale grid 100 such that each primal coarse-scale cell 140 is comprised of multiple fine-scale cells 130. The dual coarse-scale grid 120, which also conforms to the fine-scale grid 100, is constructed such that each dual coarse-scale cell 150 is comprised of multiple fine-scale cells 130. For example in FIG. 1, both the primal coarse-scale cells 140 and dual coarse-scale cells 150 contain 5×5 fine-scale cells 130. One skilled in the art will appreciate that the primal coarse-scale and dual coarse-scale grids, respectively 110 and 120, can be much coarser than the underlying fine grid 100. It is also emphasized that the system and methods disclosed herein not limited to the simple grids shown in FIG. 1, as very irregular grids or decompositions can be employed, as well as, other sized grids such as the coarse-scale and dual coarse-scale cells containing 7×7 or 11×11 fine-scale cells.

Reordering associated with the dual coarse grid. The primal coarse-scale grid 110 defines a partition of the domains into $N_n$ primal coarse-scale cells 140, $\Omega=\cup_{i\in[1,N_n]}\overline{\Omega}_i$. If the dual coarse-scale grid 120 is constructed by connecting centrally located fine-scale cells contained within adjacent primal coarse cells 140, as shown in FIG. 1, the dual coarse-scale grid 120, $\{\tilde{\Omega}^d\}_{d\in[1,N_D]}$, which consists of elements $\tilde{\Omega}^d$, naturally defines a partition of the points $\{x_j\}$ into node cells 160, edge cells 170, and internal cells 180. In particular, transitions between adjacent dual coarse-scale cells 150 form interfaces 190 that overly and traverse the fine-scale cells. Edge cells 170 are fine-scale cells having an interface traversing therethrough. Node cells 160 are fine-scale cells having portions of at least two interfaces 190 traversing therethrough. Internal cells 180 are fine-scale cells free of an interface 190 between adjacent dual coarse-scale cells. The dual coarse grid 120, is preferably constructed such that its nodes are the cell centers of primal coarse grid 110. Hence, the dual grid naturally defines a partition of the points $x_j \in I_f$ into node, edge and internal points. Therefore, $$I_f = I_i \cup I_e \cup I_n \quad \text{Equation (2)}$$

The sets $I_i$, $I_e$, and $I_n$ consist of $N_i$, $N_e$, and $N_n$ cells or points, respectively. To describe the MSFV algorithm, it is useful to reorder the system in Eq. (1) such that internal points appear first, and node points last. This operation is performed by a $N_f \times N_f$ permutation matrix $\hat{P}$, such that $$\tilde{u} = \hat{P}u = [\tilde{u}_i, \tilde{u}_e, \tilde{u}_n]^T \text{ and } \tilde{r} = \hat{P}r = [\tilde{r}_i, \tilde{r}_e, \tilde{r}_n]^T \quad \text{Equation (3)}$$

where $\tilde{u}_k = [\tilde{u}(x_j \in I_k)]^T$ and $\tilde{r}_k = [\tilde{r}(x_j \in I_k)]^T$, with $k \in \{i, e, n\}$. Consider Cartesian coarse grids and use the standard natural (alphabetic) reordering: dual cells, dual boundaries and dual nodes are ordered lexicographically, and so are ordered their internal elements.

Figure 2:
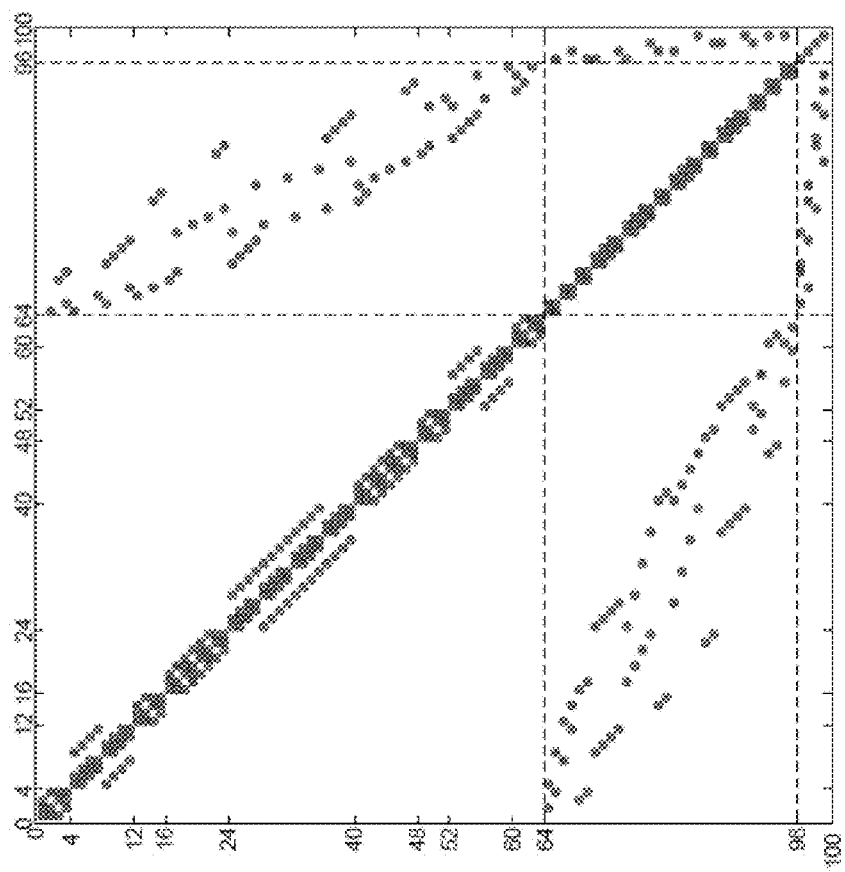
FIG. 2 is a graph showing a sparsity pattern of matrix $\tilde{A}=\tilde{P}A\hat{P}^T$ for the fine-scale grid depicted in FIG. 1.

By recalling the orthogonality of permutation matrices, Eq. (1) can be rewritten in the form $$\tilde{A}\tilde{u} = \tilde{r} \quad \text{Equation (4)}$$

where $$\tilde{A} = \hat{P}A\hat{P}^T = \begin{bmatrix} \tilde{A}_{ii} & \tilde{A}_{ie} & 0 \\ \tilde{A}_{ei} & \tilde{A}_{ee} & \tilde{A}_{en} \\ 0 & \tilde{A}_{ne} & \tilde{A}_{nn} \end{bmatrix} \quad \text{Equation (5)}$$

is the reordered coefficient matrix. The block $\tilde{A}_{jk}$ represents the effects of the unknowns $\tilde{u}_{k \in \{i, e, n\}}$ on the equation corresponding to $x_j \in I_{j \in \{i, e, n\}}$. The sparsity pattern of $\tilde{A}$ is illustrated in FIG. 2 for the grid depicted in FIG. 1.

Approximate pressure solution. Instead of solving Eq. (4) directly, the MSFV method computes an approximate solution (dual pressure) by solving the approximate problem $$M\tilde{u} = q \quad \text{Equation (6)}$$

where M is the MSFV dual pressure operator (hereafter "MSFV operator" or "MSFV matrix"), which can be defined block-wise (analogously to $\tilde{A}$ in Eq. 5); and q the appropriate source term vector.

The MSFV operator is constructed by assuming that the solution can be approximated by a juxtaposition of localized solutions computed on the dual cells, i.e., $\tilde{u} = U_d \tilde{u}|_{\Omega_d}$. Localization is achieved by requiring that fluxes transverse to the edges are negligible for the equations corresponding to the edge themselves; this is equivalent to require that Dirichlet boundary conditions for the localized problems are obtained by solving a reduced problem along the edges. Hence, we have $M_{ei} = 0$, $M_{ne} = 0$, and $$M_{ee} = \tilde{A}_{ee} + \text{diag}[\Sigma_r \tilde{A}_{ie}^T] \quad \text{Equation (7)}$$

which is the "reduced-problem" operator—where the operator "diag[•]" transforms a vector into a diagonal matrix.

Under these assumptions, the approximate solution can be expressed as a linear combination of vectors:

$$\tilde{u} = B\tilde{u}_n + Cq \quad \text{Equation (8)}$$

The j-th column of the $N_f \times N_n$ matrix B is the basis function (interpolator) relative to the j-th node, which describes the contribution from a unit pressure applied at the node $x_{j \in I_n}$; whereas the vector $C_q$ is the correction function, which describes processes that do not scale with the pressure. Intuitively speaking, $B\tilde{u}_n$ is somehow analogous to a juxtaposition of (local) general solutions of the problem with zero source term, whereas $C_q$ is analogous to a local particular solution of the problem (with $\tilde{u}_n = 0$); $\tilde{u}_n$ is determined by the constraint imposed by the coarse problem defined below.

To derive this global problem, the control-volume summation operator $\chi$ is defined, which is represented by a $N_n \times N_f$ matrix. Each row of $\chi$ is associated with a coarse cell 140: when applied to a vector of size $N_f$, the operator returns a vector of size $N_n$, whose entries are the sums of all values assumed by the original vector in the corresponding coarse cells. Substituting Eq. (8) into Eq. (4) and applying $\chi$, the coarse-scale operator is obtained $$M_{nn} = \chi \tilde{A} B \quad \text{Equation (9)}$$

which is the lower diagonal block in M, and the coarse-scale right hand side of the equation becomes $$q_n = \chi(\tilde{r} - \tilde{A}Cq) \quad \text{Equation (10)}$$

Figure 3:
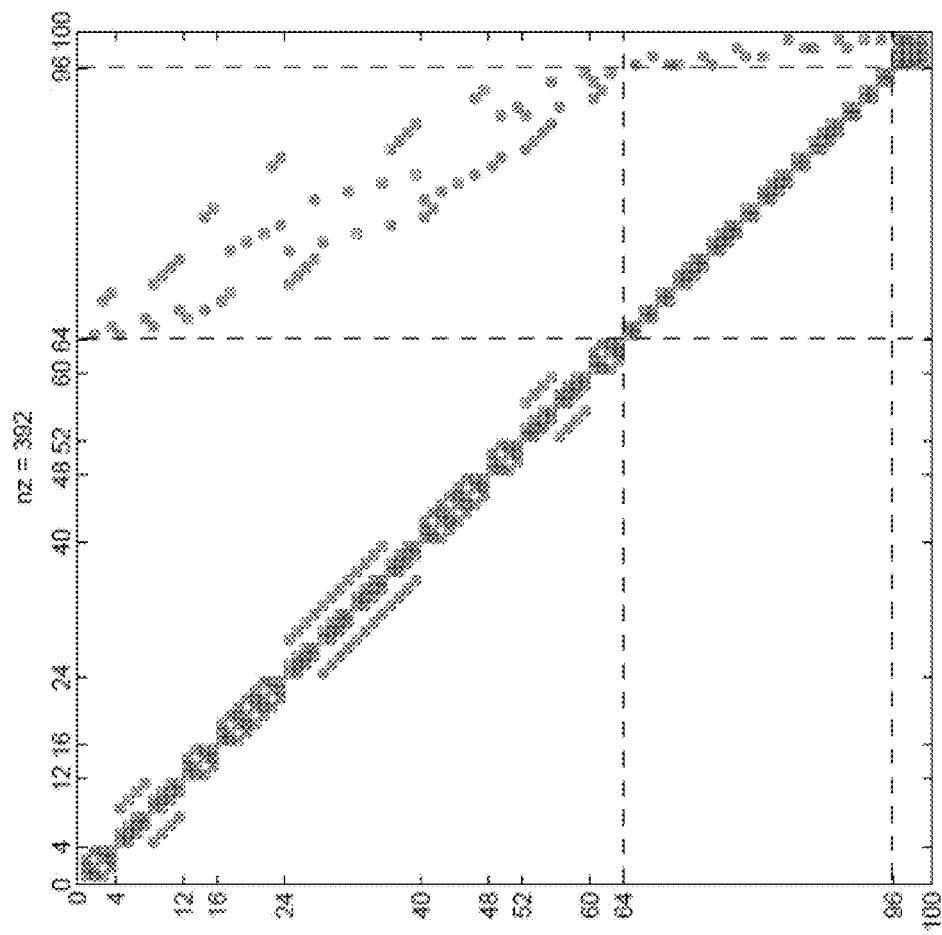
FIG. 3 is a graph showing a sparsity pattern of the multi-scale finite volume matrix M for the fine-scale grid depicted in FIG. 1.
Figure 4:
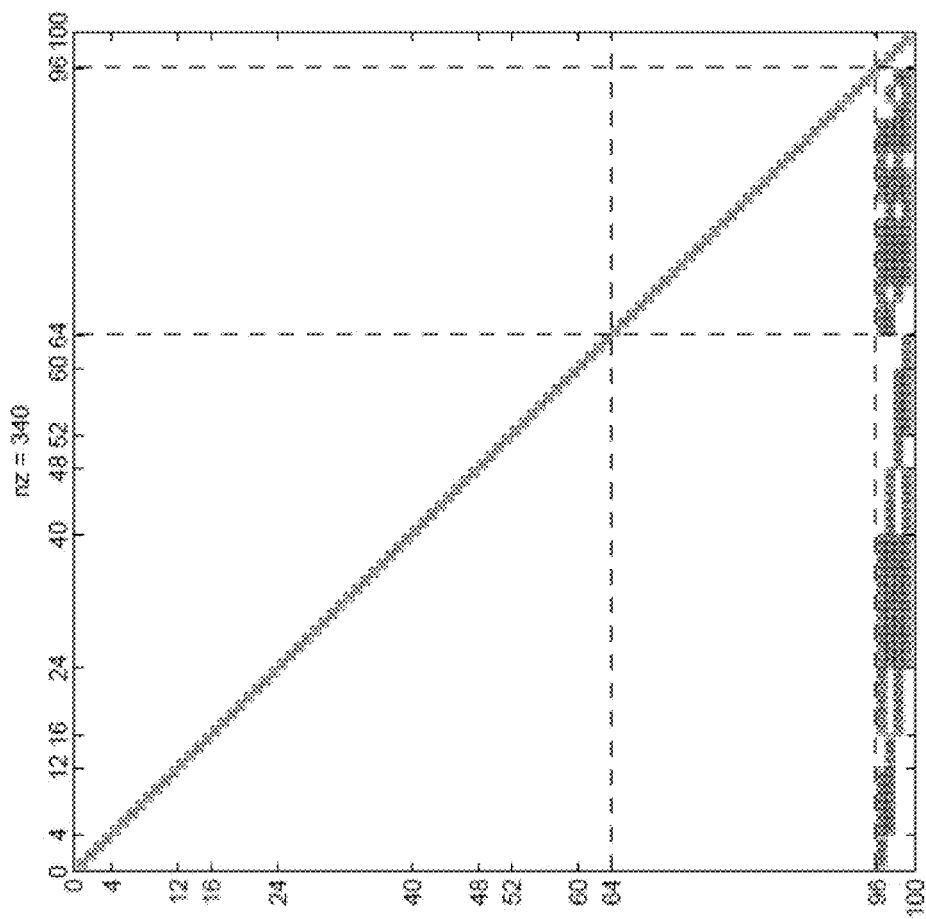
FIG. 4 is a graph showing a sparsity pattern of matrix $Q=E+R^T\chi$ for the fine-scale grid depicted in FIG. 1.

Therefore, the MSFV operator in Eq. (6) is $$M = \begin{bmatrix} \tilde{A}_{ii} & \tilde{A}_{ie} & 0 \\ 0 & \tilde{M}_{ee} & \tilde{A}_{en} \\ 0 & 0 & \tilde{M}_{nn} \end{bmatrix} \quad \text{Equation (11)}$$

and the right hand side of the equation is $$q = (I - R^T R - R^T \chi \tilde{A} C + R^T \chi)\tilde{r} = (E + R^T \chi)\tilde{r} = Q\tilde{r} \quad \text{Equation (12)}$$

where the operators are defined $Q = E + R^T \chi$, $E = I - R^T R - R^T \chi \tilde{A} C$, $R = [0\ 0\ I_{nn}]$, and $I_{nn}$ and I are an $N_n \times N_n$ and $N_f \times N_f$ identity matrix, respectively. The sparsity patterns of M and Q for the grid depicted in FIG. 1 is illustrated in FIGS. 3 and 4. Localization is achieved by removing the internal point-edge point connection when the edge-point equations are solved; the fine scale node-point equations are replaced by coarse-scale equation obtained integrating over the control volumes 150 defined by the coarse grid 110. FIG. 4 is the sparsity pattern of the matrix $Q = E + R^T \chi$. The last row in Eq. (11) corresponds to the coarse-scale problem defining the node pressure; whereas the upper part of the matrix corresponds to the construction of an approximate solution by superimposition of basis and correction functions. Note that inserting $\tilde{u}_n = M_{nn}^{-1} q_n = M_{nn}^{-1} R_q$ into Eq. (8) and observing that $\tilde{u} = M^{-1} q$, the multiscale inverse matrix as can be easily written as $$M^{-1} = B M_{nn}^{-1} R + C \quad \text{Equation (13)}$$

The approximate pressure can be obtained as a solution of the MSFV system, Equation (6). Constructing the coarse-scale operator, $M_{nn} = \chi \tilde{A} B$, includes defining the finite-volume summation operator, $\chi$, which is an $N_n \times N_f$ matrix with entries $$\chi_{jk} = \begin{cases} 1 & \text{if } x_k \in \bar{\Omega}_j \\ 0 & \text{otherwise} \end{cases} \quad \text{Equation (14)}$$

and the basis-function operator, the $N_f \times N_n$ matrix $$B = M^{-1} R^T M_{nn} = \begin{bmatrix} (\tilde{A}_{ii})^{-1} \tilde{A}_{ie} (M_{ee})^{-1} \tilde{A}_{en} \\ -(M_{ee})^{-1} \tilde{A}_{en} \\ I_{nn} \end{bmatrix} \quad \text{Equation (15)}$$

where $M_{ee}$ is the reduced-problem operator, Equation (7). Additionally, the right hand side, Equation (12) includes the definition of the operator $E=I-R^TR-R^T\tilde{A}C$ where $$C = M^{-1}(I - R^TR) = \begin{bmatrix} (\tilde{A}_{ii})^{-1} & -(\tilde{A}_{ii})^{-1}\tilde{A}_{ie}(M_{ee})^{-1} & 0 \\ 0 & (M_{ee})^{-1} & 0 \\ 0 & 0 & 0 \end{bmatrix} \quad \text{Equation (16)}$$

is the corrective function operator ($N_f \times N_f$ matrix).

Conservative flux field. The fluxes associated with solution of Eq. (6) are non-conservative: due to the localization assumption, the approximate pressure is not a solution of the original problem along the dual boundaries, and fluxes are discontinuous across edge points, which act as sources. To avoid balance errors when solving transport problem, a conservative flux field is constructed as juxtaposition of local solutions computed on the primary coarse cells. These procedure is made possible as the approximate pressure derived in the previous sections is conservative on the coarse grid: $\chi(\tilde{r}-\tilde{A}\tilde{u})=0$.

Figure 5:
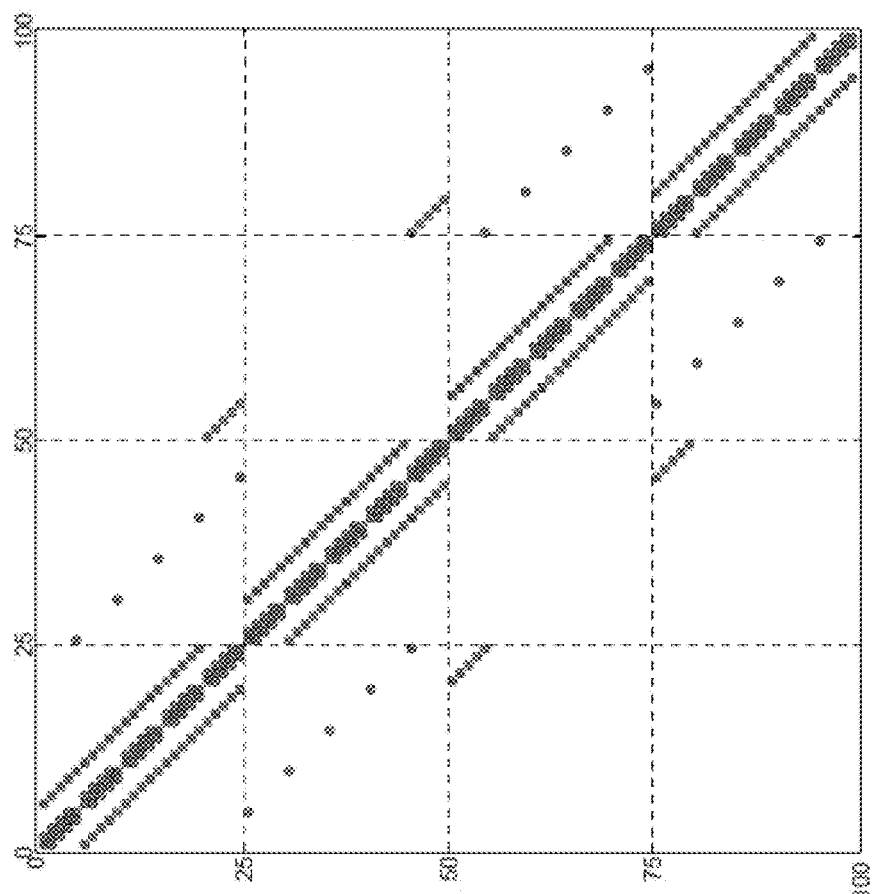
FIG. 5 is a graph showing a sparsity pattern of matrix $\bar{A}= \bar{P}A\hat{P}^T$ for the fine-scale grid depicted in FIG. 1.

Analogous to $\tilde{P}$, a permutation operator $\overline{P}$, which replaces the fine-scale lexicographic order by an ordering that is lexicographic in each coarse cell, is naturally associated with the primary coarse grid. The permutated or reordered matrix of the grid 110 depicted in FIG. 1, matrix, $$\overline{A}=\overline{P}A\overline{P}^T \quad \text{Equation (17)}$$

has a pentadinagonal block structure, if also the coarse cell are in lexicographic order (FIG. 5). The original pentadiagonal structure is modified by the permutation operator $\overline{P}$ into the block pentadiagonal structure. Each diagonal block corresponds to a coarse cell $\overline{\Omega}_j$; off diagonal blocks contain the connections between nodes belonging to two distinct but adjacent coarse cells.

Decomposing the reordered matrix as $$\overline{A}=D+U+L \quad \text{Equation (18)}$$

where D, U, and L are block diagonal, strictly block upper triangular, and strictly block lower triangular matrices, respectively; then we consider the solution of the problem $$D'\overline{u}=\overline{r}-(\overline{A}-D')\overline{P}\tilde{P}^TM^{-1}q \quad \text{Equation (19)}$$

where $$D'=D+\text{diag}[\Sigma_j(\overline{A}_{jk}-D_{jk})] \quad \text{Equation (20)}$$

Eq. (19) is equivalent to solving localized problems on the coarse cells with Neumann boundary conditions extracted from the dual pressure. The conservative flux field is constructed from the dual pressure gradient (solution of Eq. (6)) across the boundaries of the coarse cells, and from the solution of Eq. (19) elsewhere.

MSFV Iterations. Since the multiscale operator, M, and the fine-scale operator, $\tilde{A}$, are different, the MSFV solution never coincides with the fine-scale solution for dimension d>1, even if the coarse (nodal) pressure, $\tilde{u}_n$, is exact. This is due to the localization assumption, which neglects fluxes across subdomain boundaries (edges). The localization error can be reduced if realistic estimates of these fluxes are obtained and added as a source term in the reduced problems. The improved solution, $\tilde{u}^\mu$, can be written as $$\tilde{u}^\mu=M^{-1}q+M^{-1}E(M-\tilde{A})\tilde{u}^\nu \quad \text{Equation (21)}$$

where the last term estimates a source term for the reduced problems by computing the fluxes generated across the edges by the pressure field $\tilde{u}^\nu$. The transverse fluxes are calculated from the difference between the two matrices, which gives the connections removed in the generation of M and is derived using the equivalence $E(M+R^T(I_{nn}-M_{nn})R-\tilde{A})=E(M-\tilde{A})$ which follows from the property $ER^T=0$ (see Matrix Operators section herein).

Adding and subtracting $\tilde{u}^\nu$ on the right hand side of Eq. (21), $$\tilde{u}^\mu=\tilde{u}^\nu+M^{-1}\{q+[(E-I)M-E\tilde{A}]\tilde{u}^\nu\}=\tilde{u}^\nu+M^{-1}Q(\tilde{r}-\tilde{A}\tilde{u}^\nu) \quad \text{Equation (22)}$$

where the property $(E-I)M=-R^T\chi\tilde{A}$ (see Matrix Operators section herein), is used together with Eq. (12) and the definition $Q=E+R^T\chi$. Eq. (22) can be generalized by introducing the relaxation parameter $\omega^\nu$, i.e., $$\tilde{u}^\mu=\tilde{u}^\nu+\omega^\nu M^{-1}Q(\tilde{r}-\tilde{A}\tilde{u}^\nu) \quad \text{Equation (23)}$$

which has the important property that $\tilde{u}^\mu$ satisfies coarse-scale mass balance if $\tilde{u}^\nu$ or $\omega^\nu$ are appropriately chosen. Indeed, we have $$\chi(\tilde{r}-\tilde{A}\tilde{u}^\mu)=(\chi-\omega^\nu\chi\tilde{A}M^{-1}Q)(\tilde{r}-\tilde{A}\tilde{u}^\nu)=(1-\omega^\nu)\chi(\tilde{r}-\tilde{A}\tilde{u}^\nu) \quad \text{Equation (24)}$$

where we have used Eq. (23), and the properties $\chi\tilde{A}M^{-1}E=0$ and $\chi\tilde{A}M^{-1}R^T=I_{nn}$ (see Matrix Operators section herein). If $\tilde{u}^\nu$ is conservative on the coarse grid, $\tilde{u}^\mu$ is also conservative for any value of the relaxation parameter $\omega^\nu$; on the other hand, if $\omega^\nu=1$, $\tilde{u}^\mu$ is conservative for arbitrary choice of $\tilde{u}^\nu$.

The most natural choice is to set $\tilde{u}^\mu=\tilde{u}^{\nu+1}$ in Eq. (23), which yields the iterative scheme $$\tilde{u}^{\nu+1}=\tilde{u}^\nu+\omega^\nu G^{-1}\epsilon^\nu \quad \text{Equation (25)}$$

where we have defined $$G=Q^{-1}M \quad \text{Equation (26)}$$

and the residual $$\epsilon^\nu=\tilde{r}-\tilde{A}\tilde{u}^\nu \quad \text{Equation (27)}$$

in order to make notation more compact, and $\nu\geq 0$ denotes the iteration level and $\tilde{u}^0=M^{-1}q$ is the standard MSFV solution. From the sparsity patterns of $Q^{-1}$ and M (FIGS. 3 and 4) it is evident that G can be seen as a sort of approximate (block-wise) LU-decomposition of the original matrix A. Eq. (25) is a Richardson iteration with preconditioner G; according to Eq. (24), the approximate solution conserves mass on the coarse grid at any iteration. It is well-known that this iterative scheme is conditionally stable and converges if and only if $0<\omega^\mu<2/\rho$, where $\rho$ is the spectral radius of $G\tilde{A}$. In particular, the iterative scheme with $\omega^\nu=1$ does not converge if $\rho\geq 2$.

The iterative algorithm in Eq. (25) can be stabilized (and convergence can be accelerated) if the relaxation parameter $\omega^\nu$ is computed by a projection method. Projection methods calculate the relaxation parameters based on information on previous residuals: a new approximate solution is sought in a subspace generated by the residual vectors (subspace of solution) and the new residuals are constrained to be orthogonal to a second subspace (subspace of constraint). The simplest example is the Steepest Descent (SD) method, which seeks a new solution $\tilde{u}^{\nu+1}\epsilon\tilde{u}^\nu+\kappa(G^{-1}\epsilon^\nu)$ such that the residual $\epsilon^{\nu+1}\perp\kappa$ $(G^{-1}\epsilon^\nu)$, where $\kappa(G^{-1}\epsilon^\nu)=\text{span }\{G^{-1}\epsilon^\nu\}$ is the one-dimensional vector space generated by the preconditioned residual. The SD computes a relaxation parameter based on the last residual only, and convergence may be slow. A faster convergence can be obtained if more information from the residual history is used as in the Generalized Minimal Residual method (GMRES). Richardson iterations can be related to GMRES by recursively applying Eq. (25), $$\tilde{u}^\nu = \tilde{u}^{\nu-1} + \omega^{\nu-1} G^{-1} \epsilon^{\nu-1} = \quad \text{Equation (28)}$$

$$= \tilde{u}^{\nu-2} + [a^{\nu-1} + a^{\nu-2} G^{-1} \tilde{A}] G^{-1} \epsilon^{\nu-2} =$$

$$= \tilde{u}^{\nu-3} + [a^{\nu-1} + a^{\nu-2} G^{-1} \tilde{A} + a^{\nu-3} (G^{-1} \tilde{A})^2]$$

$$G^{-1} \epsilon^{\nu-3} = \dots$$

$$= \tilde{u}^0 + \left[ \sum_{\sigma=1}^{\nu} a^{\nu-\sigma} (G^{-1} \tilde{A})^{\sigma-1} \right] G^{-1} \epsilon^0 =$$

$$= \tilde{u}^0 + p_{\nu-1}(G^{-1} \tilde{A}) G^{-1} \epsilon^0$$

with initial guess $\tilde{u}^0 = M^{-1} q$. In Eq. (28) we have implicitly defined the polynomial $p_{\nu-1}(G^{-1}\tilde{A})$ of degree at most $\nu-1$, whose coefficients can be written in terms of $\omega^{\nu-\sigma}$. Eq. (28) delivers a solution $\tilde{u}^\nu \epsilon \tilde{u}^0 + \kappa_\nu(G^{-1}\epsilon^0, G^{-1}\tilde{A})$, since $$p_{\nu-1}(G^{-1}\tilde{A}) G^{-1} \epsilon^0 \epsilon \kappa_\nu(G^{-1}\epsilon^0, G^{-1}\tilde{A}) \quad \text{Equation (29)}$$

where $$\kappa_\nu(G^{-1}\epsilon^0, G^{-1}\tilde{A}) = \text{span}\{G^{-1}\epsilon^0, (G^{-1}\tilde{A})G^{-1}\epsilon^0, (G^{-1}\tilde{A})^2 G^{-1}\epsilon^0, \dots, (G^{-1}\tilde{A})^{\nu-1} G^{-1}\epsilon^0\} \quad \text{Equation (30)}$$

is the Krylov subspace of degree $\nu$. GMRES computes the coefficients of $p_{\nu-1}(G^{-1}\tilde{A})$ such that the $l_2$-norm of the preconditioned residual is a minimum or, equivalently, that $G^{-1}\epsilon^{\nu+1} \perp G^{-1}\tilde{A}\kappa_m(G^{-1}\epsilon^\nu, G^{-1}\tilde{A})$, which is equivalent to considering the preconditioned system of the form $$G^{-1}\tilde{A} = M^{-1} Q \tilde{A} \tilde{u} = M^{-1} Q \tilde{r} = G^{-1} \tilde{r} \quad \text{Equation (31)}$$

It should be observed, however, that the residual $\epsilon^\nu$ is nonzero only on edge points (the residual is zero in the internal points), whereas the preconditioned residual $G^{-1}\epsilon^\nu$, which is equal to the solution increment, is in general nonzero everywhere. It is therefore advantageous to split the preconditioner into left and right preconditioners, $Q^{-1}$ and $M$. The approximate problem then becomes $$Q\tilde{A}M^{-1}\tilde{v} = Q\tilde{r}, \tilde{v} = M\tilde{u} \quad \text{Equation (32)}$$

From the associative property of the matrix product, this is mathematically equivalent to the Richardson equation (25), with $\omega^\nu$ chosen such that $\|Q\epsilon^{\nu+1}\|_2$ is a minimum. The fact that the preconditioned residual, $Q\epsilon^\nu$, is now zero in the internal points allows reducing the dimensionality of the GMRES problem, thus reducing memory and computational cost.

In practical implementation, the GMRES algorithm constructs the polynomial in terms of an orthogonal basis, which is formed explicitly using the Arnoldi method, and creates a Hessenberg matrix that allows computing the residual without explicitly computing the solution. Since the computational complexity of GMRES is $O(\nu_{max}^2(N_f-N_t))$ and the memory cost is of order $O(\nu_{max}(N_f-N_t))$, GMRES with restart can be useful if many iterations are needed: after m steps, one sets $\tilde{u}^0=\tilde{u}^\nu$ and restarts, GMRES(m). GMRES is mathematically equivalent to a Richardson-iterative scheme where the relaxation parameters $\omega^\nu$ are optimized based on sets of successive residuals. Based on the equivalence to Richardson equation, Eq. (28), it is evident that, if $\tilde{u}_0=M^{-1}q$, this iterative scheme satisfies coarse-scale mass balance at any iteration (for any $\nu$). Therefore, the algorithm can be stopped at any point to construct an approximate conservative flux field, as described in the conservative flux field section above herein.

Iterative algorithms with smoother. The MSFV iterations can also be stabilized by estimating the transverse fluxes in Eq. (23) from a field $\tilde{u}$ different from $\tilde{u}^{\mu+1}$. In this case the field $\tilde{u}^\nu$ is delivered by an internal loop that uses an iteration matrix S different from $G^{-1}=M^{-1}Q$. Following the terminology of Multi-Grid methods, the internal loop is referred to as the "smoothing iterations", or simply "smoother", and the matrix S as the "smoothing operator". This strategy was recently proposed to improve the accuracy of the MSFV method with Line Relaxation (LR) as the smoother. In this case the matrix decomposition, $A=A_x+A_y$, is used, where $A_x$ and $A_y$ represent the discretization of the problem in the x and y directions, respectively. The LR smoother is obtained by successively applying $(A_x+\text{diag}[A_y])$ and $(A_y+\text{diag}[A_x])$.

Although any unconditionally stable, converging iterative scheme can be used, there is a family of natural smoothers that can be constructed based on the MSFV data structure. In particular, the primal coarse-grid partition (see the conservative flux field section above herein) allows implementing Schwarz algorithms: the Dirichlet Additive Schwarz (DAS) smoother, D, and Dirichlet Multiplicative Schwarz (DMS) smoother, (D+U). The former corresponds to a block-Jacobi preconditioner based on the decomposition in Eq. (18); whereas the latter corresponds to a block-Gauss-Seidel preconditioner.

The MSFV iterations with LR smoother has two important differences from those with Krylov accelerators presented in the previous section. First, the coarse residual is not zero in the inner loop; and a conservative solution can be obtained only after applying the preconditioner $M^{-1}Q$ in the outer loop. Second, this algorithm is only conditionally stable: it is necessary to smooth the residual a certain number of times to obtain a converging scheme; if the residual is not sufficiently smooth, the iterative scheme will diverge. This problems can be avoided by combining the smoothing operator, S, and the MSFV iterative operator, $M^{-1}Q$, in a two-step preconditioner with a Krylov-subspace accelerator. In this case, the local solutions on dual blocks and coarse blocks are alternatively used. Since the smoother operator can be seen to increase the degree of overlapping between dual blocks, we refer to this scheme to as the Overlapping Domain iterations (MSFV-OD). The iteration matrices employed in this study are summarized in Table 1.

TABLE 1

Summary of the iteration matrices employed.

| Method | Matrix | Second-step Matrix |
|---|---|---|
| MSFV (Multiscale Finite Volume) | $M^{-1}Q$ | — |
| MSFV-OD (Overlapping Domain) | $D^{-1}$ or $(D+U)^{-1}$ | $M^{-1}Q$ |
| Smoothers: | | |
| DAS (Dirichlet Additive Schwartz) | $D^{-1}$ | — |
| DMS (Dirichlet Multiplicative Schwartz) | $(D+U)^{-1}$ | — |
| LR (Line Relaxation) | $(A_x+\text{diag}[A_y])^{-1}$ | $(A_y+\text{diag}[A_x])^{-1}$ |

Convergence Studies. The convergence of the different iterative schemes is investigated numerically for two-dimensional test problems representing a variety of heterogeneous fields that can arise in problems related to flow in porous media. To examine the robustness of the iterative numerical methods, five problems were studied: (1) statistically heterogeneous systems, (2) MSFV with smoothers, (3) a homogeneous system with high grid aspect ratio, (4) a system with impermeable shale layers, and (5) a channelized formation with extreme permeability contrast.

Statistically heterogeneous systems. The computational domains are discretized by a Cartesian grid consisting of 100×100 fine cells; the coarse grid used by the iterative MSFV algorithm consists of 20×20 coarse cells, which corresponds to 5×5 fine per coarse cells. The assigned boundary conditions are zero gradient (no-flow) at all domain boundaries; additionally two Dirichlet boundary conditions (fixed pressure) are imposed at two opposite corner cells to create the so called Quarter Five-Spot configuration (QFS).

Figure 6:
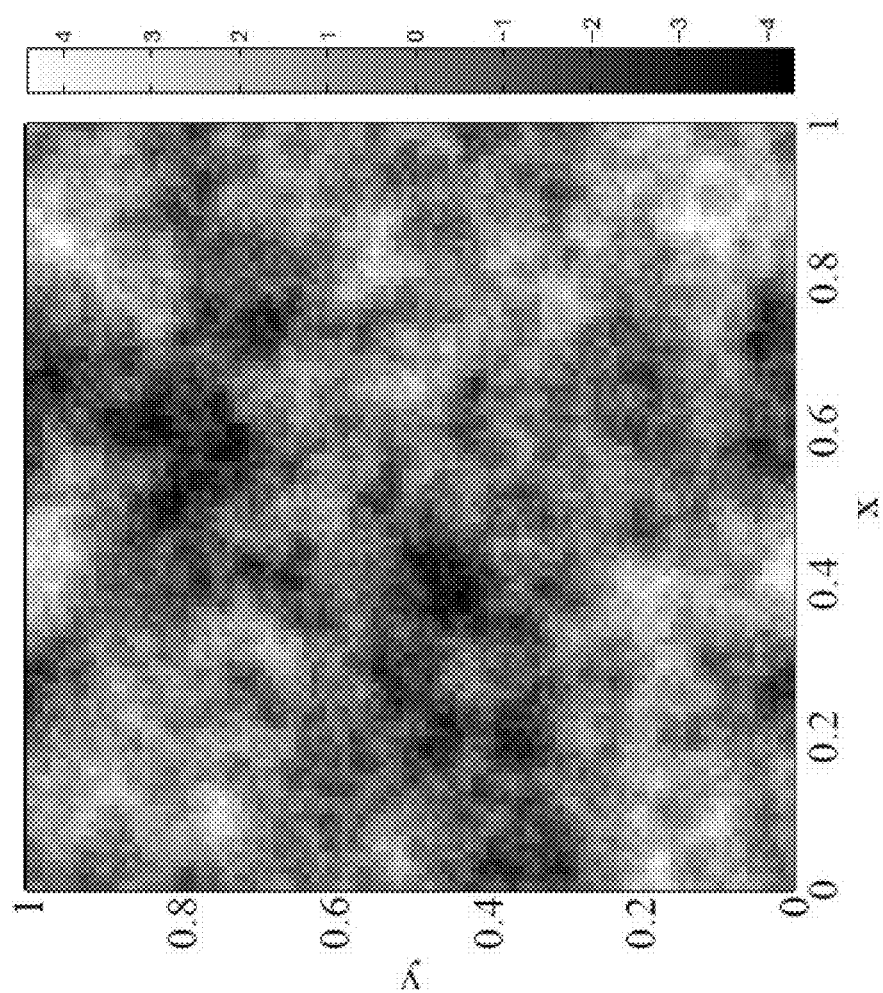
FIG. 6 illustrates a 100×100 fine-scale grid having a statistically isotropic permeability field and a quarter five spot well configuration.
Figure 7:
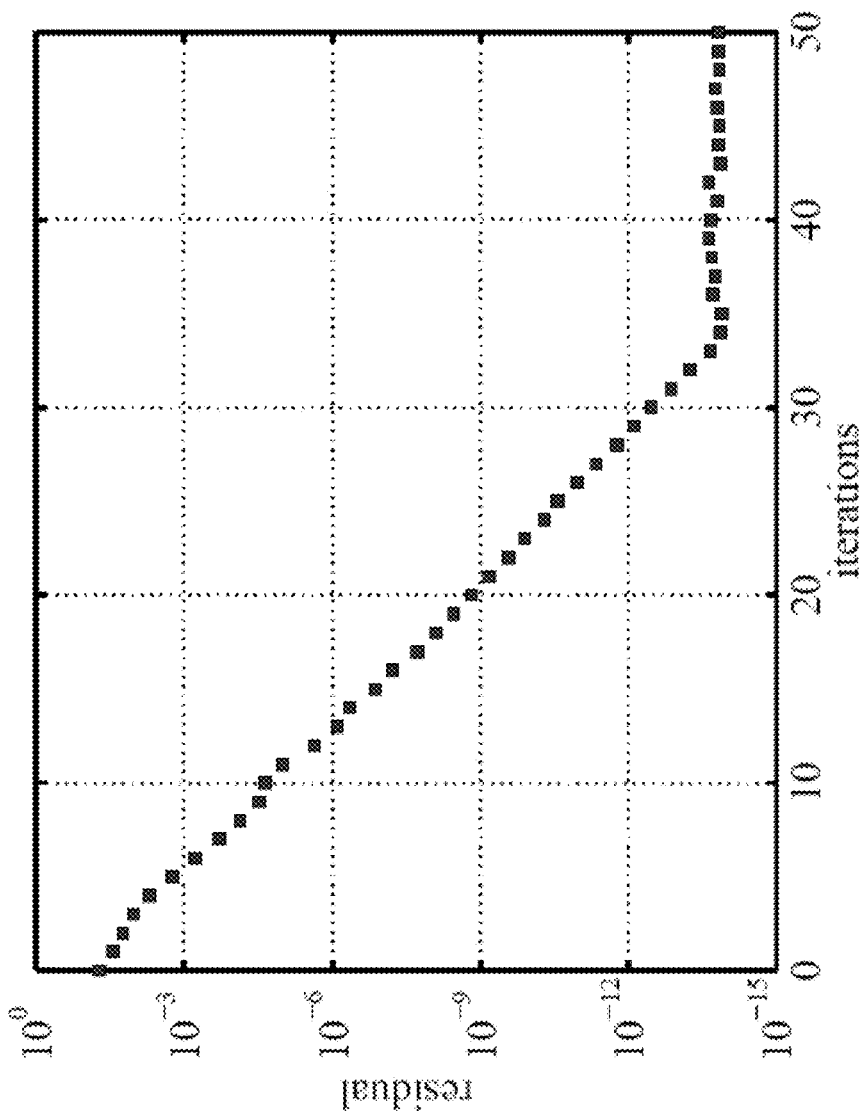
FIG. 7 is a graph of the convergence history of MSFV iterations for the isotropic permeability field illustrated in FIG. 6.
Figure 8:
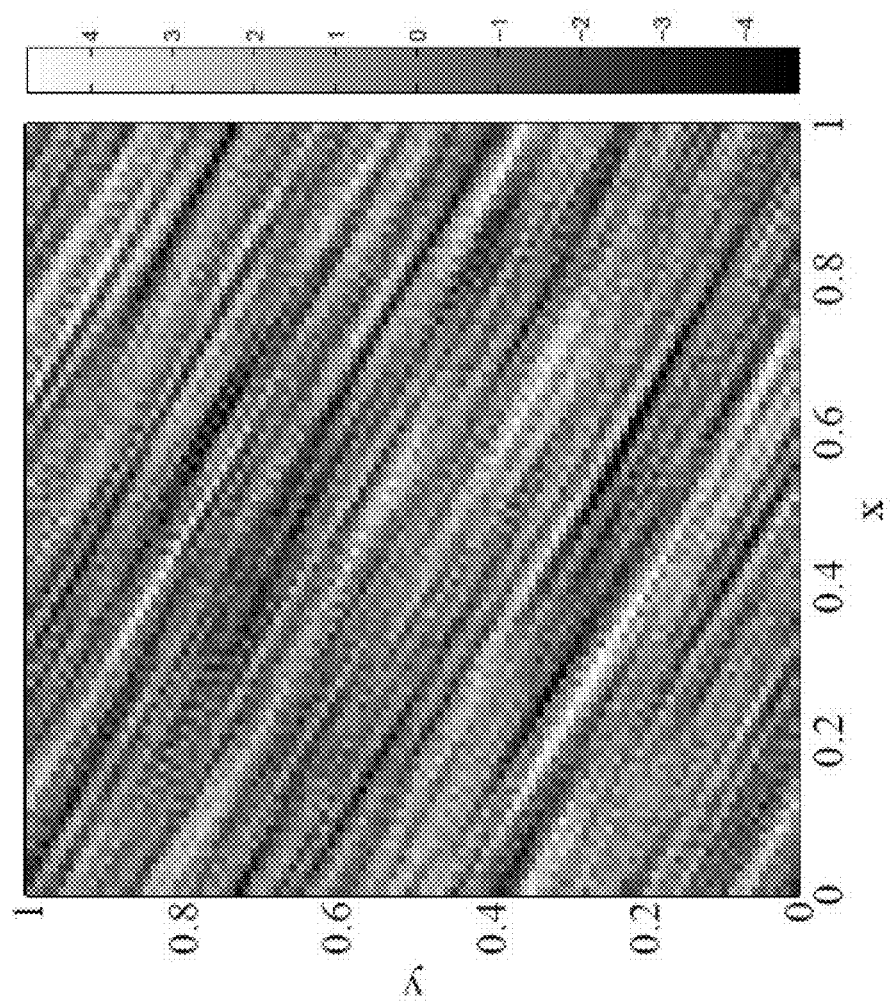
FIG. 8 illustrates a 100×100 fine-scale grid having a statistically anisotropic permeability field and a quarter five spot well configuration.

FIGS. 6-9 are from a test case with the statistically isotropic permeability field (ISO-field) (FIGS. 6-7) and the anisotropic permeability field (ANISO-field) (FIGS. 8-9) with quarter five spot (QFS) configurations, in which wells are at the top-left and bottom right corners (FIG. 6). Simulations were performed on a 100×100 fine grid 100, whereas the coarse-scale grid 110 is 20×20. The natural logarithm of the statistically isotropic permeability field (ISO-field) follows a normal distribution with mean 0.0 and variance 1.87, and has exponential variogram with correlation length equal to 1/10 of the domain size (FIG. 6). The natural logarithm of the statistically anisotropic field (ANISO-field) also follows a normal distribution with mean 0.0 and variance 1.99, but has anisotropic exponential variogram with the principal axis rotated by sixty (60) degrees with respect to the coordinate axis (the correlation length in the principal-axis direction is 1/5 and 1/100 of the domain size; FIG. 8). The coefficient matrix, A, is constructed from this field by taking the harmonic average of the values in the two adjacent cells.

Figure 9:
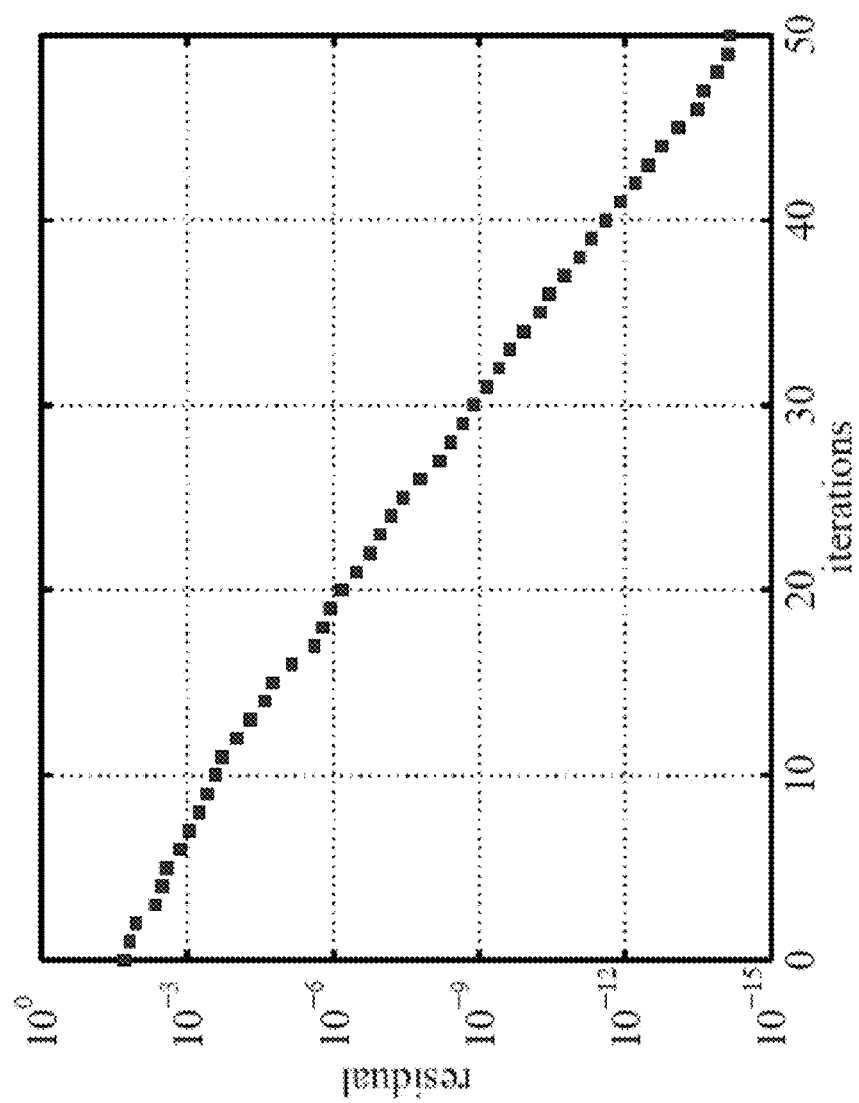
FIG. 9 is a graph of the convergence history of MSFV iterations for the anisotropic permeability field illustrated in FIG. 8.

The convergence histories of MSFV iterations with Krylov-subspace accelerator (MSFV-GMRES) for the ISO- and ANISO-field are illustrated in FIGS. 7 and 9, respectively, where we plot the maximum residual, $\|\tilde{r}-A\tilde{u}\|_\infty$, as a function of the iterations. A regular convergence behavior can be observed, which leads to machine-precision convergence in 40 iterations for the isotropic and 50 iterations for the anisotropic case, respectively. No sensitive differences in convergence history have been observed for different location of the source terms (upper-left and lower-right vs. upper-right and lower-left corners): in particular for the ANISO-field, the number of iterations does not significantly depend on the orientation of the main flow with respect to the anisotropy axis corresponding to the longer correlation length.

Figure 10:
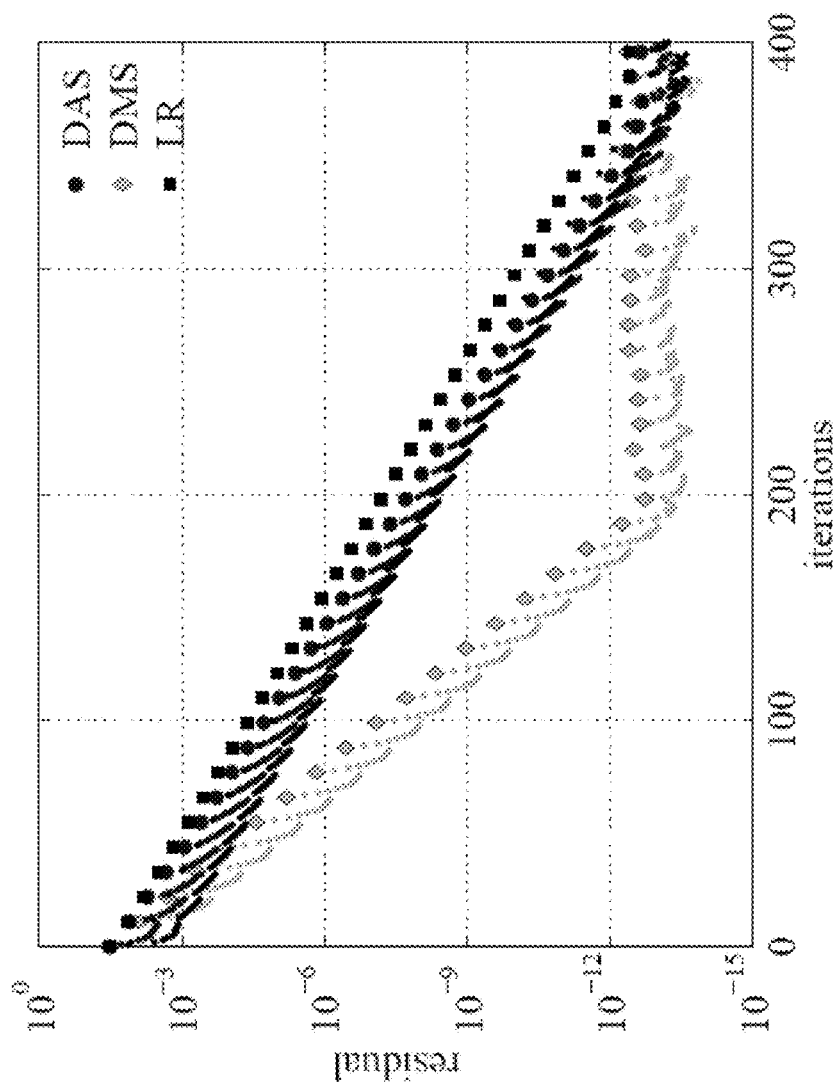
FIG. 10 is a graph of the convergence histories of MSFV iterations for the anisotropic permeability field illustrated in FIG. 8 using various smoothers.

MSFV with smoothers. The convergence history of the MSFV iterations with smoothers is shown in FIG. 10, where the performances of different smoothers (DAS, DMS, LR) are compared for a QFS in the ANISO-field. Plotting the maximum residual as functions of total iterations, which is the sum of MSFV iterations (symbols) and smoothing steps (dots). It is apparent that MSFV-DMS needs half of total iterations than MSFV-DAS and MSFV-LR. Although the MSFV operator and the smoothers all have linear complexity, $O(N_f)$, the actual computational costs of an iterations might differ and is strongly dependent on the specific implementation. Additionally, the cheapest smoother typically requires a sensitive fraction of CPU time. In 2D for instance, LR is quite appealing because it involves the solution of approximately $2 \times N_f^{1/2}$ tri-diagonal problems of size $N_f^{1/2}$. Even assuming an optimized implementation (which uses the Thomas algorithm for tri-diagonal systems, $8N_f$ operations, and does not compute the residual explicitly, such that $4N_f$ operations to compute the fluxes and form the right hand side), LR requires $24N_f$ per iterations. In comparison, 2D DAS or DMS steps, which have computational costs similar to MSFV steps, require solving $N_c$ penta-diagonal problems of approximate size $N_u = N_f/N_c$ (the upscaling factor) and bandwidth $N_u^{1/2}$, which have total complexity $O(N_f N_u)$. If one uses, for instance, Gaussian elimination, the number of operations required to solve a single problem is $(N_u + 8N_u^{1/2} + 1)N_u$; whereas the operation to form the right hand side are negligible, $6N_u^{-1/2}$, because this operations are required only on the boundary. For the upscaling factor $N_u = 5 \times 5$, the $N_c$ problems require $67N_f$ operations, which is less than 3 times the cost of LR. This implies that for the problem in FIG. 10 the computational costs to converge with MSFV-LR and MSFV-DMS are similar (MSFV-LR requires a total work roughly equivalent to 170 iterations of the other operators; a smoothing loop is slightly cheaper than 4 iterations). However, the robust extension of LR to 3D problems is plane relaxation, which requires a 2D multigrid approach in each plane and can lead to a substantial increase in number of iterations.

Figure 11:
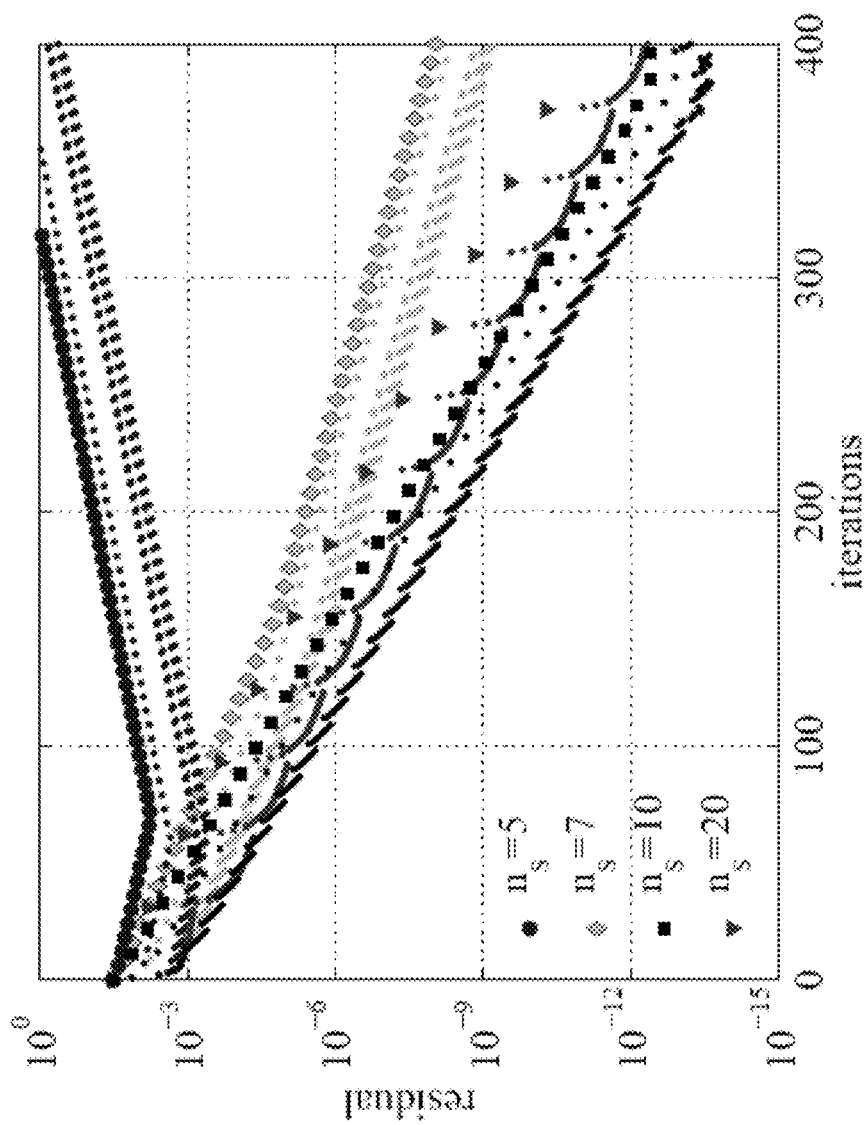
FIG. 11 is a graph of the convergence histories of MSFV iterations for the anisotropic permeability field illustrated in FIG. 8 using the LR smoother with various smoothing steps.

In principle, developing a robust algorithm in which the number of iterations does not increase dramatically for difficult and/or large test cases is more important than minimizing the number of operations per iterations: efficiency is more likely to be achieved by controlling the number of iterations than by small improvements in the coefficient of the linear complexity. Indeed, an important drawback of these algorithms is their conditional stability: they diverge if the error is not smoothed enough, but the number of smoothing steps is problem dependent, thus unknown a priori (FIG. 11). This is a consequence of the oscillatory behavior of the residual, which increases when the MSFV operator is applied. For the test case considered here, MSFV-LR diverges for $n_s \leq 5$; MSFV-DAS for $n_s \leq 6$; and MSFV-DMS for $n_s \leq 3$. This shortcoming might be avoided by combining smoothers and Krylov subspace method as in the MSFV-OD, which couples MSFV iterations with DAS or DMS and employs GMRES to accelerate convergence.

Figure 12:
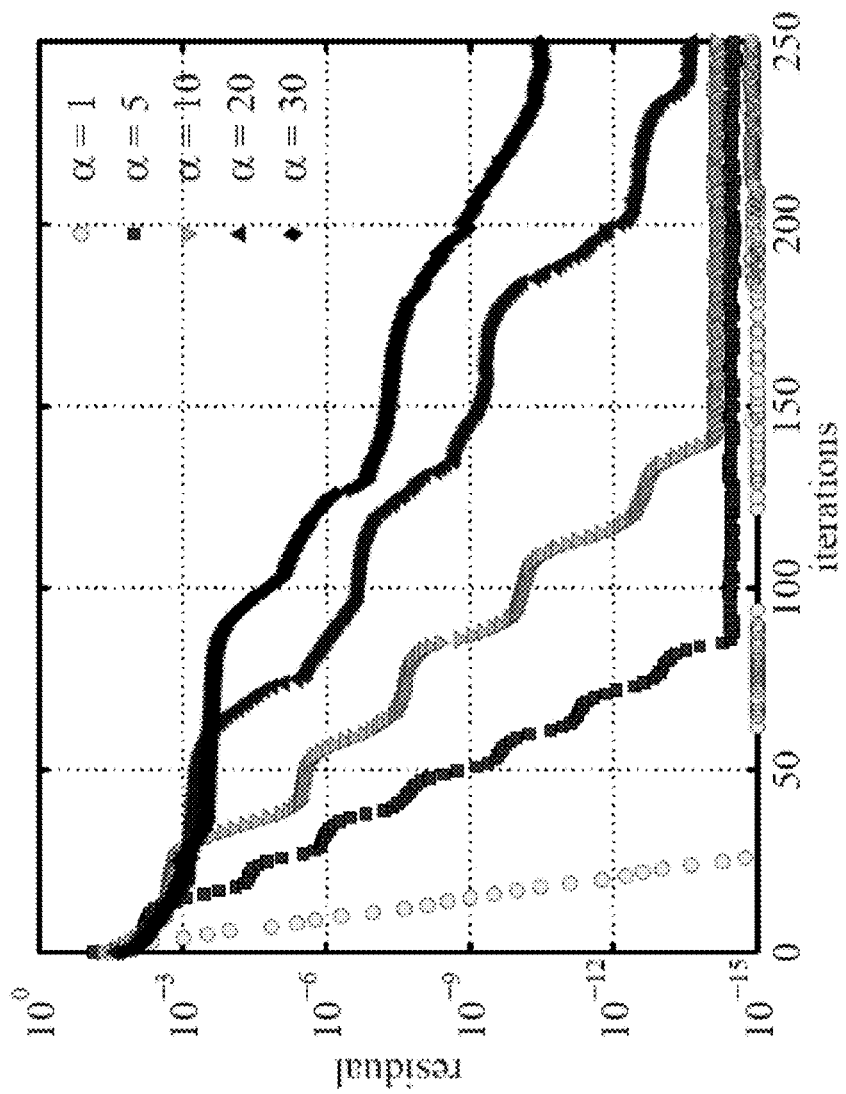
FIG. 12 is a graph of the convergence histories of MSFV iterations for a homogeneous permeability field for various grid aspect ratios.
Figure 13:
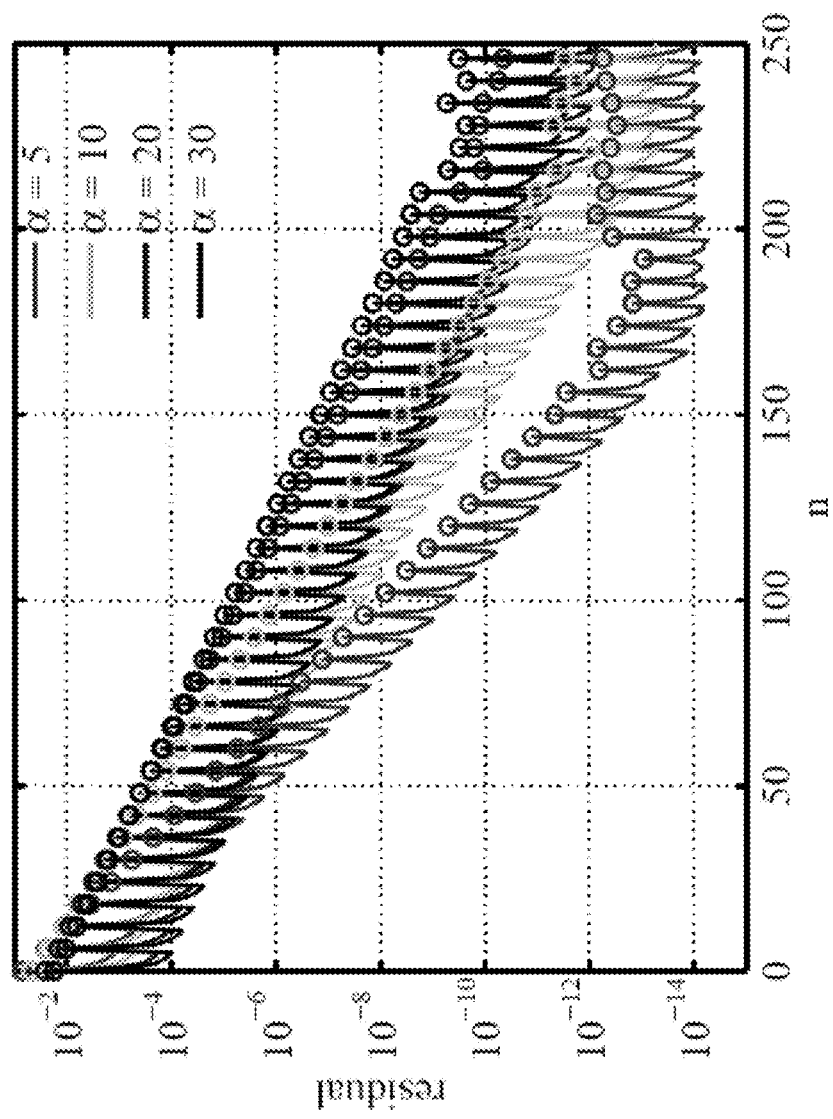
FIG. 13 is a graph of the convergence histories of MSFV iterations for a homogeneous permeability field for various grid aspect ratios and using the LR smoother.

Anisotropic grids. Referring to FIGS. 12 and 13, a second class of problems consists of five homogeneous fields with increasing anisotropy ratio ($\alpha = \Delta x / \Delta y = 1, 5, 10, 20, 30$). Grids with high aspect ratio have been recognized as a challenging problem for the MSFV method, whose solution deteriorates and yields large numerical errors when the anisotropy ratio increases. Mathematically this is due to a loss of monotonicity of the multiscale operator similar to the one observed in Multi-Point Flux Approximation schemes. Physically this is caused by the solution of the reduced problem along the edges: neglecting fluxes across dual edges is not justified when the transverse permeability is larger than the permeability along the boundary. In this case, the inadequate localization assumption creates unphysical recirculation in the conservative flux fields delivered by the MSFV method. Hesse et al. [M. A. Hesse, B. T. Mallison, and H. A. Tchelepi. *Compact multiscale finite volume method for heterogeneous anisotropic elliptic equations*. Multiscale Model. Simul., 7(2):934-962, 2008] tried to improve the MSFV solution by employing linear approximation a compact coarse-grid discretization. Lunati and Jenny [I. Lunati and P. Jenny. *Treating highly anisotropic subsurface flow with the multiscale finite volume method*. Multiscale Model. Simul., 6(1):208-218, 2007] showed that the solution can be partially improved by the use of damped-shear boundary conditions for the conservative velocity fields; however, this approach does not improve the pressure approximation computed on duals. To improve thereon, the transverse fluxes are estimated from the edge residuals and improving them iteratively.

The numerical study of the convergence behavior for anisotropic fields is performed on domains that are discretized by a Cartesian grid consisting of 100×100 fine cells; as before, the coarse grid used by the iterative MSFV algorithm consists of 20×20 coarse cells, which corresponds to 5×5 fine per coarse cells. The convergence history is depicted in FIG. 12 and shows that MSFV-GMRES is robust and converges also for highly anisotropic fields, but the number of iterations grows with the anisotropy ratio. In FIG. 13 the convergence history for MSFV iterations with LR smoother (MSFV-LR) is shown as a function of the total number of iterations, which is the sum of MSFV (circles) and LR smoother steps (solid lines). MSFV-LR needs more total iterations to converge for moderately anisotropic problems, but the number of total iterations does not drastically grow for very anisotropy ratios. The reason is that, in the latter case, the exact solution tends to become one-dimensional and the convergence rate of MSFV-LR, which exactly solves one-dimensional problems, stops deteriorating. Therefore, LR appears as an excellent smoother for Cartesian grids with anisotropy axis aligned with the grid axis, but its convergence rate deteriorates if the anisotropy axis are not aligned with the lines of relaxation, as it is demonstrate in FIGS. 10 and 11.

Figure 14:
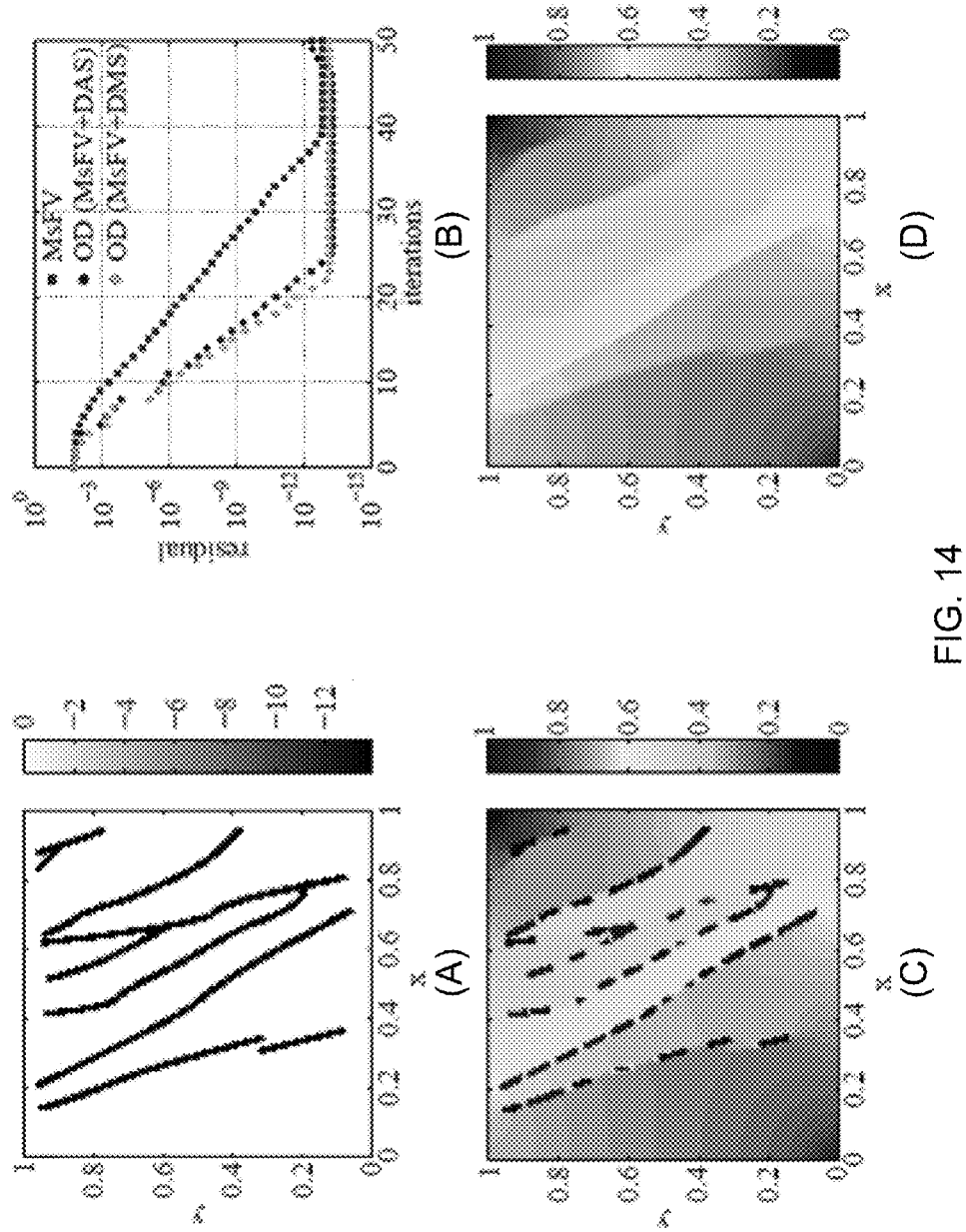
FIG. 14A illustrates a heterogeneous permeability field consisting of multiple shale layers.
FIG. 14B is a graph of the convergence histories of MSFV iterations for the heterogeneous permeability field illustrated in FIG. 14A for various smoothers.
FIG. 14C is a schematic showing the approximate pressure solution for the heterogeneous permeability field illustrated in FIG. 14A using the original MSFV method.
FIG. 14D is a schematic showing the converged pressure solution for the heterogeneous permeability field illustrated in FIG. 14A in accordance with an aspect of the present invention.

Impermeable shale layers. Referring to FIGS. 14A-14D, in order to consider fields with characteristics similar to those encountered in subsurface flow applications, two additional fields mimic the presence of impermeable structures (shale layers) or permeable meanders, which produce tortuous flow fields. The first field (SHALE-field) is a binary field consisting of multiple, intersecting layers embedded in a $10^6$-times more transmissive matrix and acting as flow barriers (FIG. 14A). The field is represented on a 125×125 grid and a 25×25 coarse grid is employed for MSFV simulations, which corresponds to 5×5 fine per coarse cells. The assigned boundary conditions create the QFS flow configuration: zero-gradient (no-flux) conditions are imposed at the domain boundary, and Dirichlet conditions 1 and 0 at the lower-left and upper-right corner cells, respectively. The solution obtained with the original MSFV method (without iterations) is depicted in FIG. 14C, which exhibits unphysical peaks in correspondence of the impermeable layers. By iterating, these peaks are removed and the algorithm converges to the exact solution (FIG. 14D). The convergence history is depicted in FIG. 14B and shows that convergence is achieved in about 40 iterations if MSFV-GMRES is employed. The convergence rate can be improved if the MSFV operator is combined with the Schwarz overlap smoothers (MSVF-OD), but this comes at additional computational costs, because two preconditioners now have to be applied at each iteration.

Figure 15:
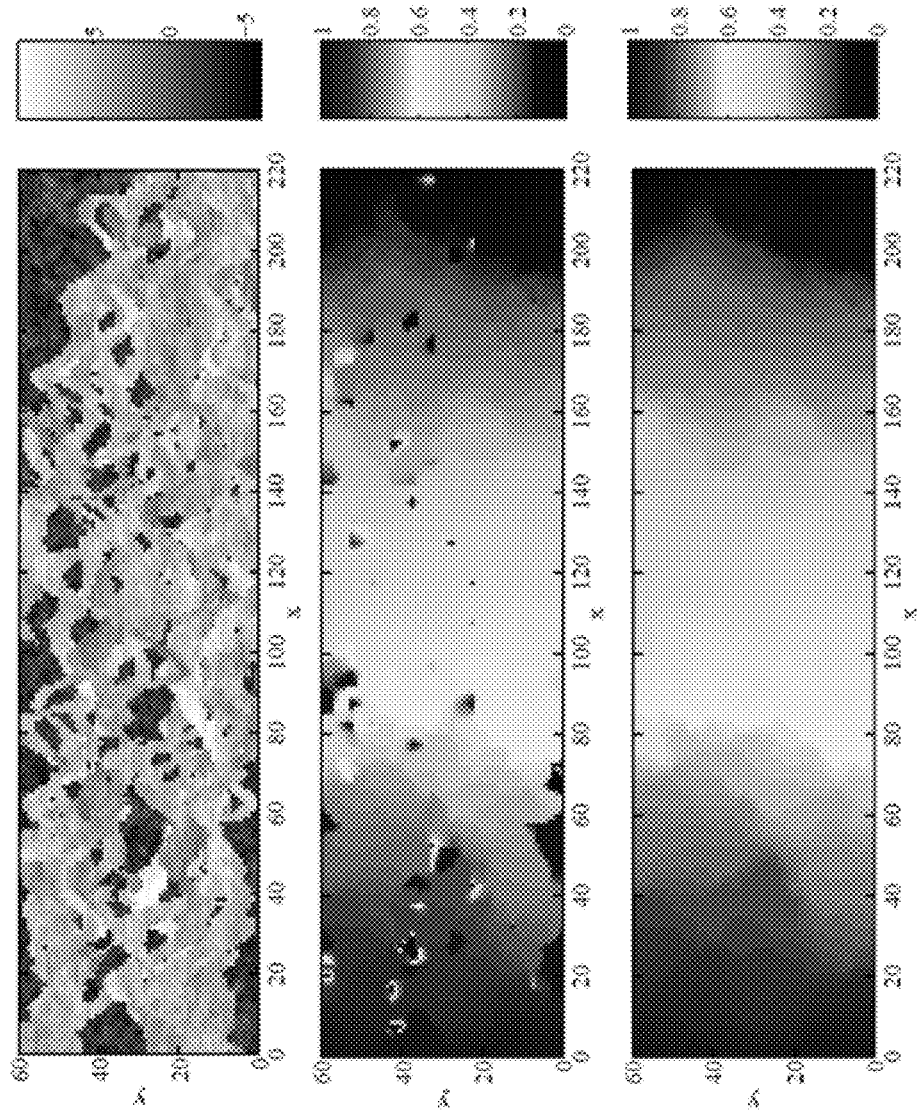
FIG. 15 illustrates a permeability field from a SPE test case (top figure), the approximate pressure solution using the original MSFV method (middle figure), and the converged pressure solution in accordance with an aspect of the present invention (bottom figure).
Figure 16:
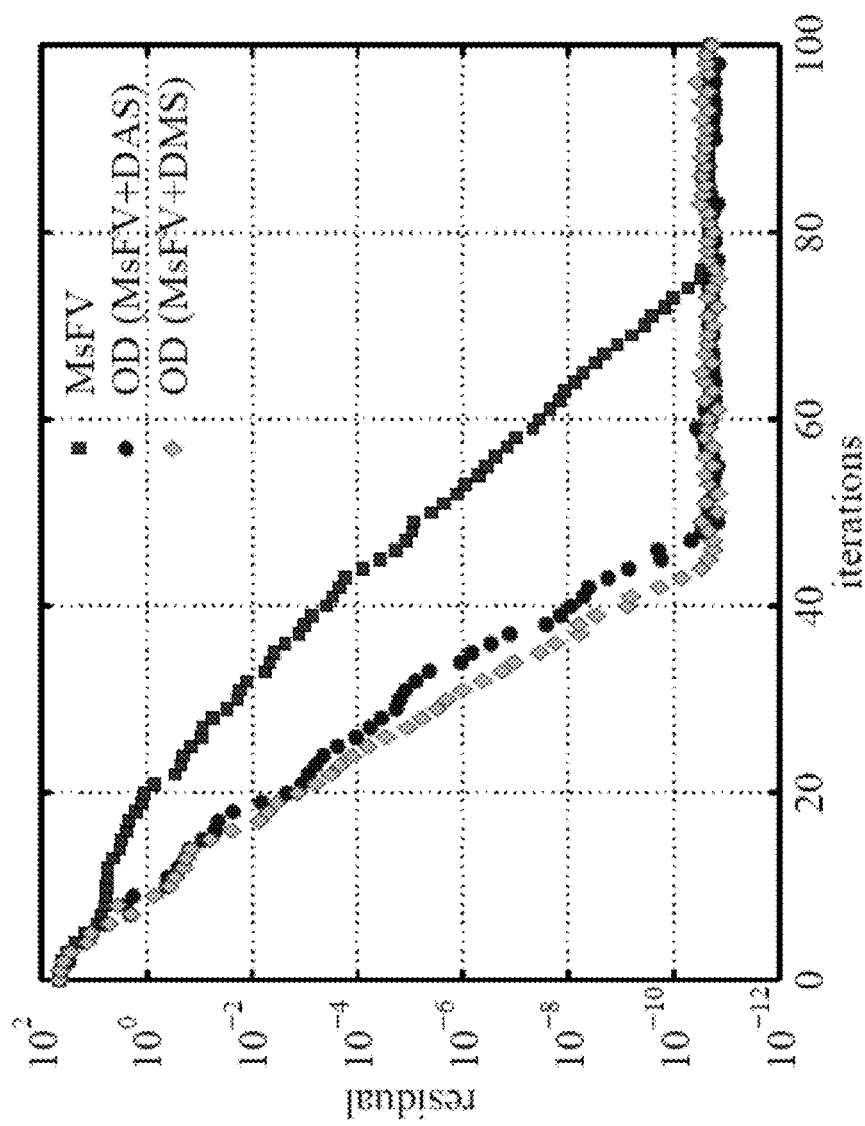
FIG. 16 is a graph of the convergence histories of MSFV iterations for a permeability field from a SPE test case for various smoothers.
Figure 17:
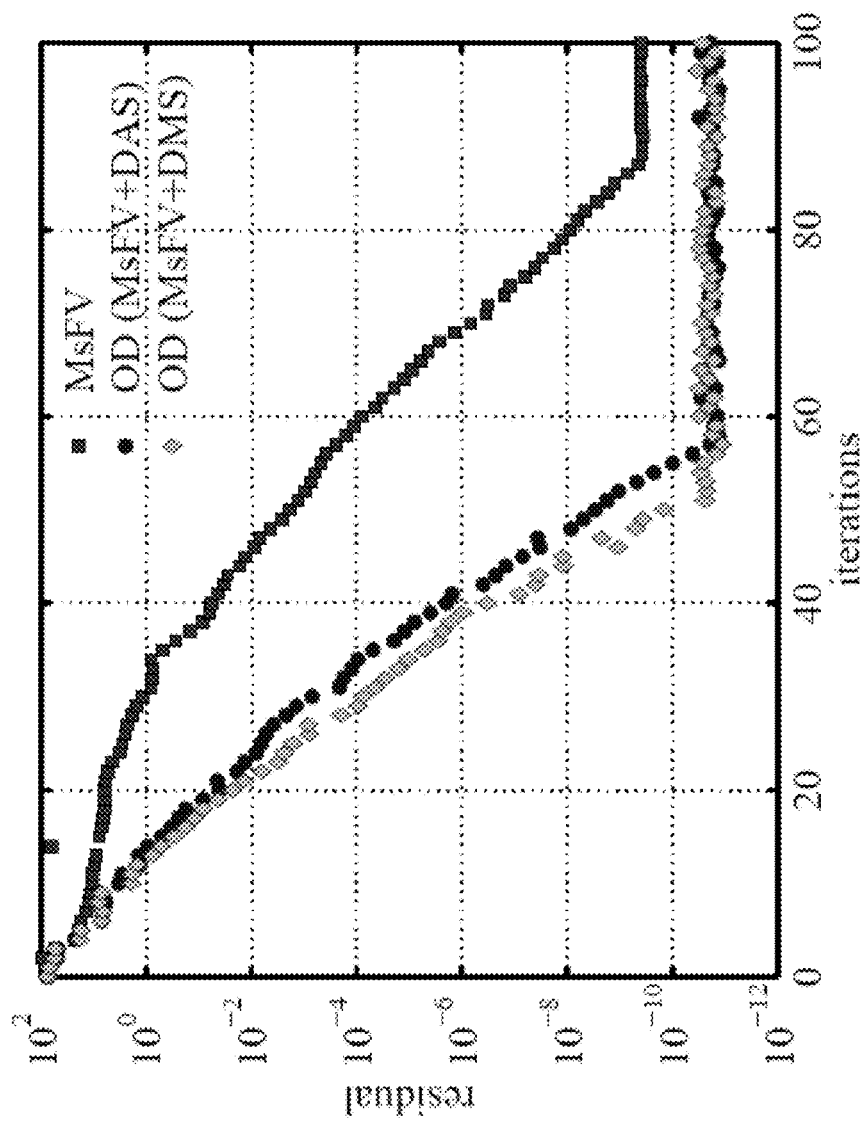
FIG. 17 is a graph of the convergence histories of MSFV iterations for a permeability field from a SPE test case for various smoothers.

Channelized formation. Referring to FIG. 15, considering a heterogeneous permeability field extracted from the bottom layer of the SPE10 test case. This field (SPE10-field) shown in the top figure is represented on a 220×60 grid, whereas the coarse grid used by the MSFV algorithm consists of 44×12 coarse cells, which again corresponds to 5×5 fine per coarse cell. The natural logarithm of the permeability (mean 3.6 and variance 12.2) displays a very irregular structure of intricate permeable meanders. The approximate pressure solution using the original MSFV method is shown in the middle figure, and the converged pressure solution is shown in the bottom figure. In this test case, Dirichlet conditions 1 and 0 are applied on the left and right boundaries, respectively; no-flow is imposed on the upper and lower boundaries. As it is shown in FIG. 16, MSFV-GMRES is able to rapidly remove the unphysical peaks contained in the original MSFV solution and converges to the exact solution in less than 80 iterations. When the upscaling factor is increased to $N_u=11\times11$ (20×5 coarse cells), the convergence rate is not drastically affected and convergence is achieved in less than 90 iterations (FIG. 17). The convergence history of MSFV-GMRES and MsVF-OD are compared in FIG. 17, which again shows that MSFV-OD requires less iteration, but a similar amount of work to converge: each iteration involves a DAS (or DMS) and a MSFV steps.

Figure 18:
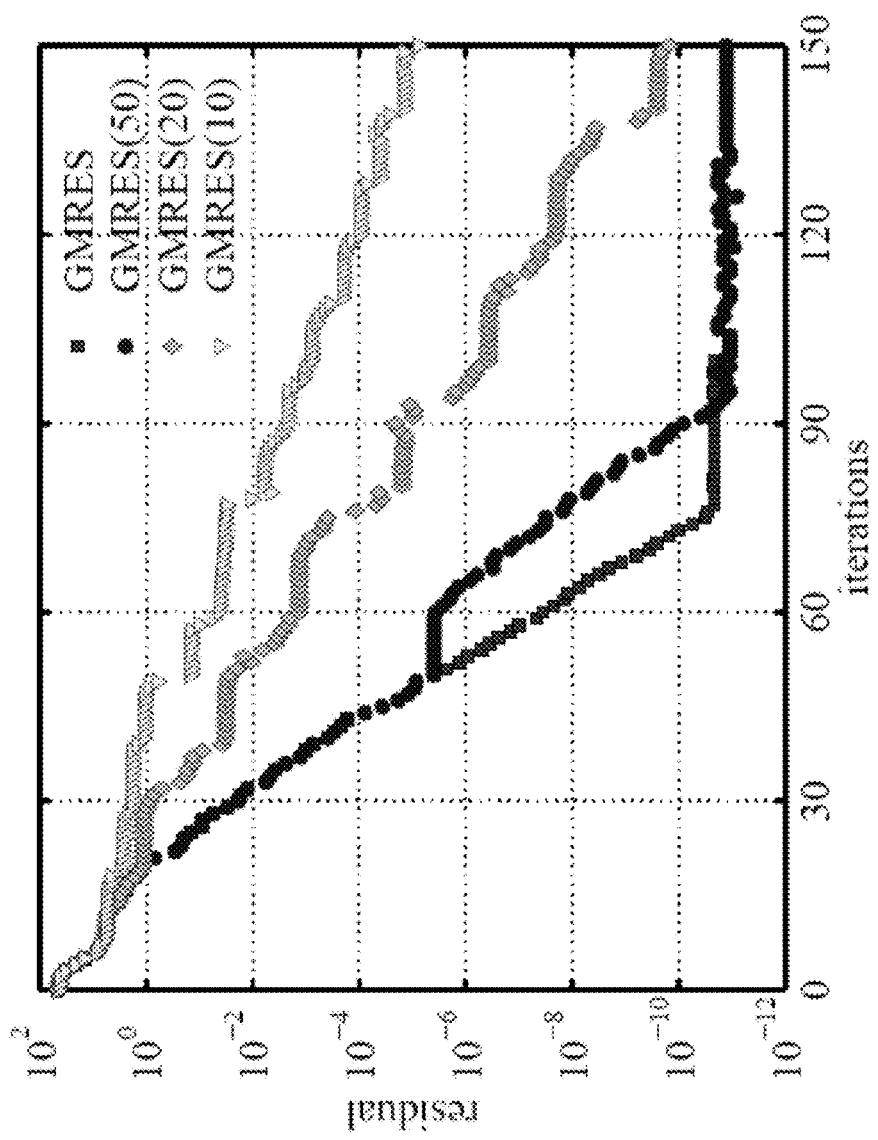
FIG. 18 is a graph of the convergence histories of MSFV iterations for a permeability field from a SPE test case.
Figure 19:
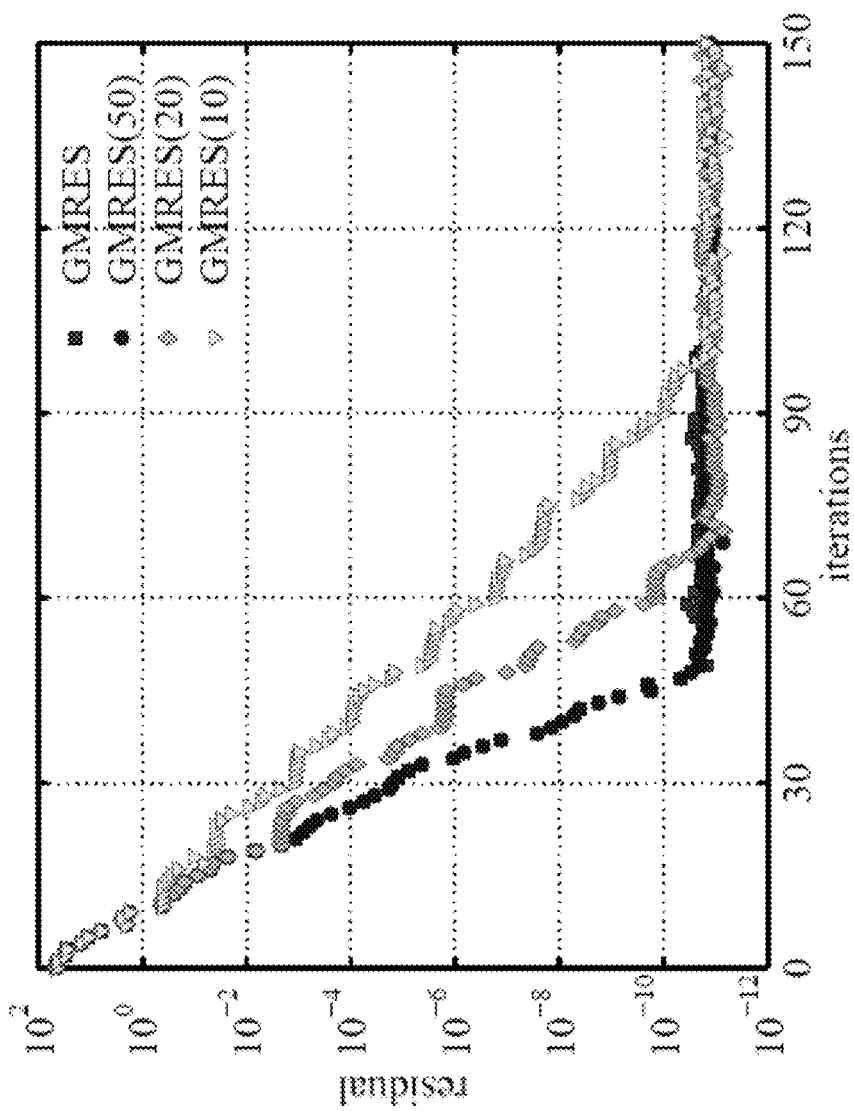
FIG. 19 is a graph of the convergence histories of MSFV iterations for a permeability field from a SPE test case using the DAS smoother.

For practical problems, restart can be used to limit the increase in memory and computational costs of GMRES. The effect of restart on the performance of MSFV-GMRES and MSVF-OD is illustrated by the convergence histories in FIGS. 18 and 19. Although the number of iterations required to converge increases, the iterative scheme is stable and converges to the exact solution for small restart parameter.

An embodiment provides a natural and robust iterative MSFV method or algorithm to improve the quality of previous MSFV solutions in numerically challenging test cases: the boundary conditions assigned to solve the local problems on dual cells are iteratively improved, leading to a more accurate localization assumption. The MSFV method relies only on the data structure of the MSFV method (which consists of a primary and dual coarse grids) to construct appropriate iterative operators, and employs a Krylov-subspace projection method (GMRES) to obtain an unconditionally stable algorithm. In one embodiment, a natural converging scheme can be constructed based on the MSFV operator only (MSFV-GMRES): in this case, the localization is improved by estimating the fluxes transversal to dual-cell boundaries directly from the previous approximate solution.

An alternative embodiment is to estimate the transverse fluxes from local solutions computed on the block of the primary coarse grid (MsVF-OD). In this embodiment, the MSFV operator is combined in a two step method with an operator derived from the problem solved to construct the conservative flux field. This method takes advantage of shift between coarse and dual grids to obtain better information on the flow near dual-cell boundaries. Therefore, it improves the solution by indirectly increasing the degree of overlapping.

Both approaches are robust and, at any iteration, deliver a solution from which a conservative flux field can be constructed. This property is particularly important in the context of the MSFV method where the goal is not to obtain an exact solution, but an approximate, conservative solution that can be used to solve transport problems without significant errors. A robust iterative algorithm opens the possibility of arbitrary reducing the error and achieves the desired level of accuracy. Obviously, this comes at the price of an additional computational load with respect to the standard MSFV method. An efficiency algorithm must find an optimal balance between accuracy and computational costs.

Since the algorithm converges to the exact solution, the method can be regarded as a linear solver. In this context, the MSFV operator is a one cell overlap, domain-decomposition preconditioner, whose relationship with the Schur complement has been recently demonstrated. The very peculiar characteristic of this operator is that at any iteration the residual is zero and the solution is conservative on the coarse grid. One of the two embodiments presented (MSFV-OD), is a two-step preconditioner that couples the MSFV operator with a Schwarz-overlap operator. Since a MSFV-OD iteration has approximately double cost with respect to a MSFV iteration, both methods require a similar computational effort to converge, even if MSFV-OD converges in about half iterations. However, the simulations performed with restarted GMRES seem to suggest that MSVF-OD might be more robust leading to a better behaving preconditioner for very large problems. The results presented here are obtained with a preconditioner splitting, Eq. (32), which seems the natural choice to confine the residual on dual-cell boundaries and reduce memory and computational costs of GMRES. Although in theory the two formulations should yield the same convergence behavior, in practice differences can be observed due to inexact arithmetic, which can affect the stopping criterion. A comparison between the two formulations did not clearly identified the optimal approach in term of convergence rate and further investigation is required to assess differences and advantages of left-preconditioning and preconditioner splitting.

Matrix Operators. The matrix operators defined in the MSFV Iterations section can have the following properties:

1. $RR^T = I_{nn}$

2. $R^T R = \begin{bmatrix} 0 & 0 & 0 \\ 0 & 0 & 0 \\ 0 & 0 & I_{nn} \end{bmatrix}$ 3. $M^{-1} = M^{-1} R^T R + M^{-1}(I - R^T R) = BM_{nn}^{-1} R + C = B(\chi \tilde{A} B)^{-1} R + C$

4. $CR^T = M^{-1}(I - R^T R) R^T = M^{-1}(R^T - R^T) = 0$

Figure 20:
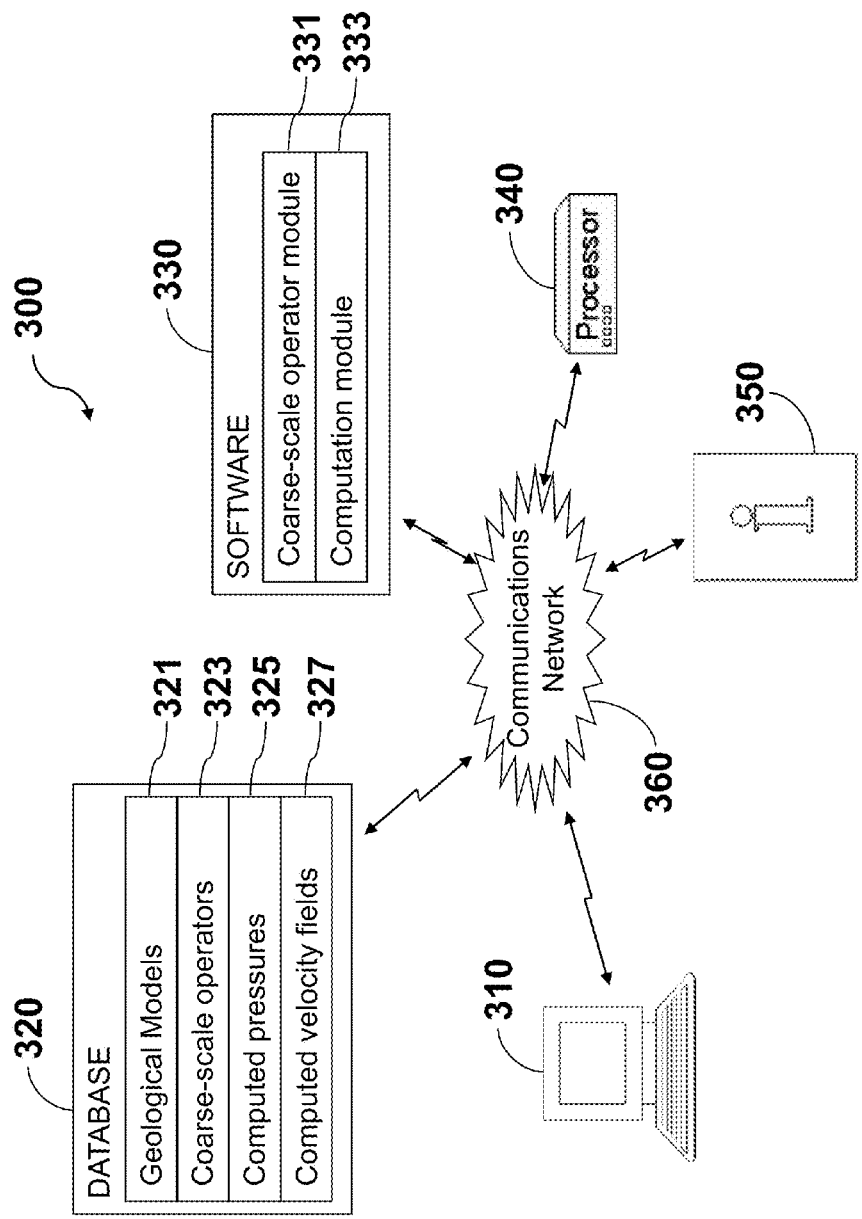
FIG. 20 is a schematic diagram of a system that can perform a multiscale finite volume method, in accordance with the present invention.

5. $ER^T = (I - R^T R - R^T \tilde{A} C) R = R^T - R^T - R^T \tilde{A}(CR^T) = 0$ 6. $CE = C - (CR^T)(R + \chi \tilde{A} C) = C$ 7. $CM = M^{-1}(I - R^T R) M =$
$I - M^{-1} R^T RM = I - BM_{nn}^{-1}(RR^T) RM - (CR^T) RM = I - BR$ 8. $RE = R - R(R^T R) - (RR^T) \chi \tilde{A} C = R - R - \chi \tilde{A} C = \chi \tilde{A} C$ 9. $(I - E)M =$
$R^T RM + R^T \chi \tilde{A}(CM) = R^T RM + R^T \chi \tilde{A} - R^T M_{nn} R = R^T \chi \tilde{A}$ 10. $M^{-1} EM = -M^{-1}(I - E - I) M = I - M^{-1} R^T \chi \tilde{A}$ 11. $\chi \tilde{A} M^{-1} E =$
$\chi \tilde{A}(B(\chi \tilde{A} B)^{-1} R + C) E = \chi \tilde{A} B(\chi \tilde{A} B)^{-1} RE + \chi \tilde{A} CE = 0$ 12. $\chi \tilde{A} M^{-1} R^T = \chi \tilde{A}(B(\chi \tilde{A} B)^{-1} R + C) R^T = \chi \tilde{A} B(\chi \tilde{A} B)^{-1} RR^T + CR^T = I_{nn}$ FIG. 20 illustrates a system 300 that can be used in simulating a fine-scale geological model of a subsurface reservoir as described by the multiscale finite volume method above. System 300 includes user interface 310, such that an operator can actively input information and review operations of system 300. User interface 310 can be any means in which a person is capable of interacting with system 300 such as a keyboard, mouse, or touch-screen display. Input that is entered into system 300 through user interface 310 can be stored in a database 320. Additionally, any information generated by system 300 can also be stored in database 320. For example, database 320 can store user-defined parameters, as well as, system generated computed solutions. Accordingly, geological models 321, coarse-scale operators 323, computed pressure solutions 325, and computed velocity field solutions 327, are all examples of information that can be stored in database 320.

System 300 includes software 330 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 330 can include a plurality of modules for performing system tasks such as performing the multiscale finite volume method previously described herein. Processor 340 interprets instructions to execute software 330, as well as, generates automatic instructions to execute software for system 300 responsive to predetermined conditions. Instructions from both user interface 310 and software 330 are processed by processor 340 for operation of system 300. In some embodiments, a plurality of processors can be utilized such that system operations can be executed more rapidly.

Examples of modules for software 330 include, but are not limited to, coarse-scale operator module 331 and computation module 333. Coarse-scale operator module 331 is capable of constructing coarse-scale operator 323. Computation module 333 is capable of computing pressure in the dual coarse-scale cells responsive to coarse-scale operator 323. Computation module 333 is also capable of computing pressure in the primary coarse-scale cells responsive to the pressure in the dual coarse-scale cells. Pressures in the dual coarse-scale cells and primary coarse-scale cells are examples of computed pressures 325 that can be stored in database 320. In some embodiments, computation module 333 computes a conservative velocity field from the pressure in the primary coarse-scale cells. The conservative velocity field is an example of a computed velocity field 327 that can be stored in database 320. Accordingly, computation module 333 is able to compute any of the computational steps of the iterative multiscale methods described herein, such as pressures and conservative flux fields while accounting for transverse fluxes between the dual coarse-scale cells such as between edge cells.

In certain embodiments, system 300 can include reporting unit 350 to provide information to the operator or to other systems (not shown). For example, reporting unit 350 can be a printer, display screen, or a data storage device. However, it should be understood that system 300 need not include reporting unit 350, and alternatively user interface 310 can be utilized for reporting information of system 300 to the operator.

Communication between any components of system 300, such as user interface 310, database 320, software 330, processor 340 and reporting unit 350, can be transferred over a communications network 360. Communications network 360 can be any means that allows for information transfer. Examples of such a communications network 360 presently include, but are not limited to, a switch within a computer, a personal area network (PAN), a local area network (LAN), a wide area network (WAN), and a global area network (GAN). Communications network 360 can also include any hardware technology used to connect the individual devices in the network, such as an optical cable or wireless radio frequency.

In operation, an operator initiates software 330, through user interface 310, to perform the multiscale finite volume method. Outputs from each software module, such as coarse-scale operator module 331 and computation module 333, can be stored in database 320. Software 330 utilizes coarse-scale operator module 331 to construct coarse-scale operator 323. Once the coarse-scale operator 323 is constructed, the computation module 333 can retrieve coarse-scale operator 323 from either database 320 or directly from coarse-scale operator module 331 and compute the pressure in the dual coarse-scale cells. Computation module 333 also computes a conservative flux field while accounting for transverse fluxes between the dual coarse-scale cells, such as between edge cells, based on the pressure in the dual coarse-scale cells. A visual display can be produced using the conservative flux field. For example, pressure distributions, velocity fields, or fluid flow within the reservoir can be displayed.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A multi-scale finite volume method for use in simulating a fine-scale geological model of a subsurface reservoir, the method comprising:
   (a) providing a fine-scale geological model of a subsurface reservoir associated with a fine-scale grid having a plurality of fine-scale cells;
   (b) defining a primary coarse-scale grid having a plurality of primary coarse-scale cells;
   (c) defining a dual coarse-scale grid having a plurality of dual coarse-scale cells, the dual coarse-scale grid defining a portion of the fine-scale cells as internal cells, edge cells, and node cells;
   (d) constructing a multi-scale matrix where blocks of the multi-scale matrix are ordered responsive to the internal cells, edge cells, and node cells;
   (e) computing pressure in the dual coarse-scale cells using a coarse-scale operator, the coarse-scale operator being a multi-diagonal block of the multi-scale matrix;
   (f) computing a conservative flux field responsive to the pressure in the dual coarse-scale cells while accounting for transverse fluxes between the dual coarse-scale cells wherein computing the conservative flux field utilizes a multi-scale inverse matrix; and
   (g) producing a display responsive to the conservative flux field.

2. The method of claim 1, wherein the edge cells are fine-scale cells having an interface traversing therethrough, the interface being a transition between adjacent dual coarse-scale cells.

3. The method of claim 2, wherein the node cells are edge cells having portions of at least two interfaces traversing therethrough.

4. The method of claim 1, wherein the node cells are fine-scale cells having portions of at least two interfaces traversing therethrough, the at least two interfaces being transitions between adjacent dual coarse-scale cells.

5. The method of claim 1, wherein the internal cells are fine-scale cells free of an interface between adjacent dual coarse-scale cells.

6. The method of claim 1, wherein the conservative flux field is further computed responsive to iteratively solved local boundary conditions.

7. The method of claim 1, wherein the transverse fluxes that are accounted for in step (f) are between edge cells.

8. The method of claim 1, wherein the transverse fluxes that are accounted for in step (f) are computed responsive to a previous pressure solution in the dual coarse-scale cells.

9. The method of claim 1, wherein the transverse fluxes that are accounted for in step (f) are computed from local solutions on the primary coarse-scale grid.

10. The method of claim 1, wherein the transverse fluxes that are accounted for in step (f) are computed using a relaxation parameter.

11. The method of claim 10, wherein the relaxation parameter is computed based on residual histories.

12. The method of claim 10, wherein the relaxation parameter is optimized based on sets of successive residuals.

13. The method of claim 1, wherein the coarse-scale operator is stabilized using a Krylov-subspace accelerator.

14. The method of claim 1, wherein the coarse-scale operator is stabilized using a smoothing operator.

15. The method of claim 1, wherein in step (g) the display comprises a representation of one of the following selected from the group consisting of pressure distributions, velocity fields, and fluid flow within the subsurface reservoir.

16. A multi-scale finite volume method for use in simulating a fine-scale geological model of a subsurface reservoir, the method comprising:
   (a) providing a fine-scale geological model of a subsurface reservoir associated with a fine-scale grid having a plurality of fine-scale cells;
   (b) defining a primary coarse-scale grid having a plurality of primary coarse-scale cells;
   (c) defining a dual coarse-scale grid having a plurality of dual coarse-scale cells such that adjacent dual coarse-scale cells form an interface that traverses some of the fine-scale cells, the fine-scale cells that are traversed by a single interface are defined as edge cells, the fine-scale cells that are traversed by portions of at least two interfaces are defined as node cells, and the fine-scale cells that are free of the interface are defined as internal cells;
   (d) computing pressure in the dual coarse-scale cells using a coarse-scale operator, the coarse-scale operator being a multi-diagonal block of a multi-scale matrix ordered responsive to the internal cells, edge cells, and node cells;
   (e) computing a conservative flux field responsive to the pressure in the dual coarse-scale cells while accounting for transverse fluxes between the edge cells wherein computing the conservative flux field utilizes a multi-scale inverse matrix; and
   (f) producing a display responsive to the conservative flux field.

17. The method of claim 16, wherein the conservative flux field is further computed responsive to iteratively solved local boundary conditions.

18. The method of claim 16, wherein the conservative flux field is further computed using a Krylov-subspace accelerator.

19. The method of claim 16, wherein the display in step (f) comprises a representation of one of the following selected from the group consisting of pressure distributions, velocity fields, and fluid flow within the subsurface reservoir.

20. A system for use in simulating a fine-scale geological model of a subsurface reservoir, the system comprising:
   a database configured to store data comprising a fine-scale geological model of a subsurface reservoir, a fine-scale grid having a plurality of fine-scale cells, a primary coarse-scale grid having a plurality of primary coarse-scale cells, a dual coarse-scale grid having a plurality of dual coarse-scale cells, and a coarse-scale operator;
   a computer processor configured to receive the stored data from the database, and to execute software responsive to the stored data;
   a software program executable on the computer processor, the software program comprising:
   (a) a coarse-scale operator module that constructs the coarse-scale operator, the coarse-scale operator being a multi-diagonal block of a multi-scale matrix ordered responsive to internal cells, edge cells, and node cells defined on the fine-scale grid by the dual coarse-scale grid; and
   (b) a computation module that computes pressure in the dual coarse-scale cells responsive to the coarse-scale operator and computes a conservative flux field responsive to the pressure in the dual coarse-scale cells while accounting for transverse fluxes between the edge cells wherein computing the conservative flux field utilizes a multi-scale inverse matrix; and
   a visual display for displaying system outputs.

21. A non-transitory processor readable medium storing software that, when executed by a processor, causes the software to simulate a fine-scale geological model of a subsurface reservoir, the medium comprising:
- a coarse-scale operator module that constructs a coarse-scale operator, the coarse-scale operator being a multi-diagonal block of a multi-scale matrix ordered responsive to internal cells, edge cells, and node cells defined on a fine-scale grid by a dual coarse-scale grid having a plurality of dual coarse-scale cells; and
- a computation module that computes pressure in the dual coarse-scale cells responsive to the coarse-scale operator and computes a conservative flux field responsive to the pressure in the dual coarse-scale cells while accounting for transverse fluxes between the edge cells, wherein computing the conservative flux field utilizes a multi-scale inverse matrix.

* * * * *